(12) United States Patent
Peterson, II et al.

(10) Patent No.: US 9,764,264 B2
(45) Date of Patent: Sep. 19, 2017

(54) BALLAST WATER TREATMENT SYSTEMS

(71) Applicant: Coating Systems Laboratories, Inc., Chandler, AZ (US)

(72) Inventors: William R. Peterson, II, Chandler, AZ (US); Delone Bentz, Phoenix, AZ (US)

(*) Notice: Subject to any disclaimer, the term of this patent is extended or adjusted under 35 U.S.C. 154(b) by 0 days.

(21) Appl. No.: 14/832,937

(22) Filed: Aug. 21, 2015

(65) Prior Publication Data

US 2015/0360155 A1 Dec. 17, 2015

Related U.S. Application Data

(63) Continuation-in-part of application No. 14/226,720, filed on Mar. 26, 2014, now Pat. No. 9,364,572, and a continuation-in-part of application No. 10/850,121, filed on May 19, 2004, now abandoned.

(60) Provisional application No. 62/040,348, filed on Aug. 21, 2014, provisional application No. 61/805,477, (Continued)

(51) Int. Cl.

| | |
|---|---|
| *B01D 11/02* | (2006.01) |
| *A61L 2/00* | (2006.01) |
| *B01D 37/02* | (2006.01) |
| *C02F 1/50* | (2006.01) |
| *B01D 29/56* | (2006.01) |
| *A23L 3/3463* | (2006.01) |
| *A23L 3/358* | (2006.01) |

(Continued)

(52) U.S. Cl.
CPC ......... *B01D 37/025* (2013.01); *A23L 3/3463* (2013.01); *A23L 3/358* (2013.01); *B01D 29/56* (2013.01); *C02F 1/004* (2013.01); *C02F 1/50* (2013.01); *C02F 2103/008* (2013.01); *C02F 2303/04* (2013.01); *C02F 2303/24* (2013.01)

(58) Field of Classification Search
CPC .............. A61L 2/00; C02F 1/00; C02F 11/00
USPC .................. 422/1, 28, 32, 261, 292
See application file for complete search history.

(56) References Cited

U.S. PATENT DOCUMENTS

| | | |
|---|---|---|
| 3,560,385 A | 2/1971 | Roth |
| 3,730,701 A | 5/1973 | Isquith et al. |
| 3,794,736 A | 2/1974 | Abbott et al. |

(Continued)

FOREIGN PATENT DOCUMENTS

| | | |
|---|---|---|
| CA | 1217004 | 1/1987 |
| EP | 675128 A1 | 10/1995 |

(Continued)

OTHER PUBLICATIONS

Isquith et al., "Surface-Bonded Antimicrobial Activity of an Organosilicon Quaternary Ammonium Chloride"; Applied Microbiology, 24(6): 859-863 (Dec. 1972).*

(Continued)

*Primary Examiner* — Monzer R Chorbaji
(74) *Attorney, Agent, or Firm* — IPTechLaw

(57) ABSTRACT

A ballast water treatment system. Implementations may include an intake screen, a ballast water intake pump coupled to the intake screen, a screen filter coupled to an outlet of the ballast water intake pump, and a multi-cartridge filter system coupled to the screen filter and with one or more ballast tanks. A ballast water dump pump may be coupled with the one or more ballast tanks. The multi-cartridge filter system may include two or more cartridge filters including a quaternary organosilane coating produced from a quaternary ammonium organosilane reagent.

18 Claims, 9 Drawing Sheets

Related U.S. Application Data filed on Mar. 26, 2013, provisional application No. 60/472,429, filed on May 22, 2003.

(51) Int. Cl.
*C02F 1/00* (2006.01)
*C02F 103/00* (2006.01)

(56) References Cited

U.S. PATENT DOCUMENTS

| | | | |
|---|---|---|---|
| 3,817,739 | A | 6/1974 | Abbott et al. |
| 3,860,709 | A | 1/1975 | Abbott et al. |
| 3,865,728 | A | 2/1975 | Abbott et al. |
| 4,005,025 | A | 1/1977 | Kinstedt |
| 4,005,028 | A | 1/1977 | Heckert et al. |
| 4,005,030 | A | 1/1977 | Heckert et al. |
| 4,161,518 | A | 7/1979 | Wen et al. |
| 4,282,366 | A | 8/1981 | Eudy |
| 4,394,378 | A | 7/1983 | Klein |
| 4,395,454 | A | 7/1983 | Baldwin |
| 4,406,892 | A | 9/1983 | Eudy |
| 4,408,996 | A | 10/1983 | Baldwin |
| 4,411,928 | A | 10/1983 | Baldwin |
| 4,414,268 | A | 11/1983 | Baldwin |
| 4,421,796 | A | 12/1983 | Burril et al. |
| 4,425,372 | A | 1/1984 | Baldwin |
| 4,467,013 | A | 8/1984 | Baldwin |
| 4,564,456 | A | 1/1986 | Homan |
| 4,567,039 | A | 1/1986 | Stadnick et al. |
| 4,615,882 | A | 10/1986 | Stockel |
| 4,631,273 | A | 12/1986 | Blehm et al. |
| 4,631,297 | A * | 12/1986 | Battice .................. A01N 25/16 210/500.1 |
| 4,682,992 | A | 7/1987 | Fuchs |
| 4,772,593 | A | 9/1988 | Whalen |
| 4,781,974 | A | 11/1988 | Bouchette et al. |
| 4,797,420 | A | 1/1989 | Bryant |
| 4,847,088 | A | 7/1989 | Blank |
| 4,908,355 | A | 3/1990 | Gettings et al. |
| 5,013,459 | A | 5/1991 | Gettings et al. |
| 5,064,613 | A | 11/1991 | Higgs et al. |
| 5,124,359 | A | 6/1992 | Wachman et al. |
| 5,281,414 | A | 1/1994 | Stockel |
| 5,359,104 | A | 10/1994 | Higgs et al. |
| 5,411,585 | A | 5/1995 | Avery et al. |
| 5,662,808 | A | 9/1997 | Blaney et al. |
| 5,855,788 | A | 1/1999 | Everhart et al. |
| 5,954,869 | A | 9/1999 | Elfersy et al. |
| 6,071,542 | A | 6/2000 | Tanimoto et al. |
| 6,146,688 | A | 11/2000 | Morgan et al. |
| 6,187,192 | B1 | 2/2001 | Johnston et al. |
| 6,402,819 | B1 | 6/2002 | De Ruiter et al. |
| 6,572,926 | B1 | 6/2003 | Morgan et al. |
| 6,613,755 | B2 | 9/2003 | Peterson et al. |
| 2001/0009239 | A1 * | 7/2001 | Shiau .................... A01N 55/00 210/764 |
| 2006/0021302 | A1 | 2/2006 | Bernard |
| 2010/0055142 | A1 | 3/2010 | Heagle et al. |

FOREIGN PATENT DOCUMENTS

| | | |
|---|---|---|
| EP | 1493452 B1 | 1/2005 |
| GB | 1433303 | 4/1976 |
| GB | 2160792 | 2/1986 |
| WO | WO 97/42200 | 11/1997 |
| WO | WO 00/72850 | 12/2000 |

OTHER PUBLICATIONS

International Search Report and Written Opinion dated Aug. 7, 2014, PCT/US2014/031922.

Isquith et al., "Surface-bonded antimicrobial activity of an organosilicon quaternary ammonium chloride"; Applied Microbiology, 24(6):859-863 (Dec. 1972).

* cited by examiner

BALLAST WATER TREATMENT SYSTEMS

CROSS REFERENCE TO RELATED APPLICATIONS

This document claims the benefit of the filing date of U.S. Provisional Patent Application 62/040,348 to William R. Peterson II, et al., entitled "Ballast Water Treatment Systems," which was filed on Aug. 21, 2014, the disclosure of which is hereby incorporated entirely herein by reference. This document also claims the benefit of the filing date of U.S. Provisional Patent Application 61/805,477, entitled "Static Microbial Fluid Disinfection Utilizing Open Cell Substrates Treated With Organosilane Quaternary Ammonium Chloride Compounds" to William R. Peterson II, et al. which was filed on Mar. 26, 2013, the disclosure of which is hereby incorporated entirely herein by reference.

This application is also a continuation-in-part application of the earlier U.S. Utility Patent Application to William R. Peterson II et al., entitled "Static Fluid Disinfecting Systems and Related Methods," application Ser. No. 14/226,720, filed Mar. 26, 2014, now pending, which was a continuation-in-part application of the earlier U.S. Utility Patent Application to William R. Peterson II et al., entitled "Antimicrobial Quaternary Ammonium Organosilane Coatings," application Ser. No. 10/850,121, filed May 19, 2004, now pending, which claimed the benefit of the filing date of U.S. Provisional Patent Application 60/472,429 entitled "Water & Fluids Purification With Bonded Quaternary Ammonium Organosilanes," to William R. Peterson II, which was filed on May 22, 2003, the disclosures of each of which are hereby incorporated entirely herein by reference.

BACKGROUND

1. Technical Field

Aspects of this document relate generally to methods and compositions for reducing the number of microorganisms in a liquid using a solid phase carrier coated with a quaternary ammonium organosilane coating.

2. Background Art

Quaternary ammonium organosilanes have been used in a wide variety of applications. U.S. Pat. No. 6,613,755 to Peterson II et al. entitled "Antimicrobial Skin Preparations Containing Organosilane Quaternaries," issued Sep. 2, 2003, the disclosure of which is hereby incorporated entirely herein by reference, discloses various examples of uses of quaternary ammonium organosilane compounds that have antimicrobial properties.

SUMMARY

Implementations of ballast water treatment systems (ballast water management systems) may include: an intake screen adapted to receive ballast water from a body of water surrounding a ship including microorganisms and a ballast water intake pump coupled to the intake screen and adapted to draw ballast water in through the intake screen. A screen filter may be coupled to the ballast water intake pump and may be adapted to perform a screening of the ballast water output by the ballast water intake pump. A multi-cartridge filter system may be coupled to the screen filter and with one or more ballast tanks configured to be coupled to the ship. A ballast water dump pump may be coupled with the one or more ballast tanks and may be adapted to draw out ballast water stored in the one or more ballast tanks and discharge it back to the body of water surrounding the ship. The multi-cartridge filter system may include two or more cartridge filters including a quaternary ammonium organosilane coating produced from a quaternary ammonium organosilane reagent having the formula:

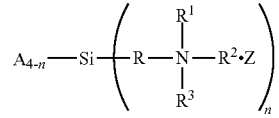

A may be a member independently selected from the group consisting of $-OR^4$, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; wherein $R^4$ may be a member selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; R may be substituted or unsubstituted alkylene; $R^1$, $R^2$, and $R^3$ may be members each independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl; and substituted or unsubstituted heteroaryl; Z may be a member selected from the group consisting of fluoride, chloride, bromide, iodide, tosylate, hydroxide, sulfate, and phosphate; and n may be 1, 2, or 3.

Implementations of ballast water treatment systems may include one, all, or any of the following:

The body of water including microorganisms may be one of salt water and fresh water.

A recirculation pump may be coupled with the one or more ballast water tanks where the recirculation pump may be coupled with a recirculation filter including one or more filter cartridges coated with the quaternary organosilane coating. The recirculation pump may be adapted to draw water from the one or more ballast water tanks through the recirculation filter and back into the one or more ballast water tanks.

The one or more ballast water tanks may further include an open-celled foam coated with the quaternary organosilane coating.

The open-celled foam may include a material selected from the group consisting of polymeric materials, stainless steel, copper, silicon, carbon, and silicon carbide.

The open-celled foam may include a range of pores per inch (PPI) of between 10 PPI and 110 PPI.

The open-celled foam may have a surface area per gram less than a surface area per gram of one of filter sand and zeolite.

A surface of the one or more ballast tanks may be coated with the quaternary organosilane coating.

The quaternary ammonium organosilane reagent includes Tetradecyldimethyl(3-trimethoxysilylpropyl)ammonium chloride; Octadecyldimethyl(3-trimethoxysilylpropyl)ammonium chloride; Didecylmethyl-N-(3-trimethoxysilylpropyl)ammonium chloride; and any combination thereof.

Implementations of a ballast water treatment system may include an intake screen adapted to receive ballast water from a body of water surrounding a ship including microorganisms. A ballast water intake pump may be coupled to the intake screen and may be adapted to draw ballast water in through the intake screen. A screen filter may be coupled to an outlet of the ballast water intake pump, where the screen filter is adapted to perform a screening of the ballast water output by the ballast water intake pump. A multi-cartridge filter system may be coupled with the screen filter and with one or more ballast tanks configured to be coupled with the ship. A ballast water dump pump may be coupled with the one or more ballast tanks and may be adapted draw out ballast water stored in the one or more ballast tanks and discharge it back to the body of water surrounding the ship. The multi-cartridge filter system comprises two or more cartridge filters including a quaternary organosilane coating produced from a quaternary ammonium organosilane reagent having the formula:

A may be a member selected from the group consisting of alkoxy radicals of 1 to 8 carbon atoms, alkylether alkoxy radicals of 2 to 10 carbon atoms, and alkyl radicals with 1 to 4 carbon atoms. R may be a divalent hydrocarbon radical with 1 to 8 carbon atoms. $R^1$ may be a member selected from the group consisting of alkyl radicals with 1 to 12 carbon atoms, alkyl ether hydrocarbon radicals of 2 to 12 carbon atoms, hydroxy-containing alkyl radicals of 1 to 10 carbon atoms, and nitrogen-containing hydrocarbon radicals of 1 to 10 carbon atoms, wherein the nitrogen atoms has three bonds. The a may be 0, 1, or 2; b may be 1, 2, or 3; and the sum of a and b may be 3. Z may be a member selected from the group consisting of chloride, bromide, iodide, tosylate, hydroxide, sulfate, and phosphate. The n may be 1, 2 or 3.

Implementations of ballast water treatment systems may include one, any, or all of the following:

The body of water including microorganisms may be one of salt water and fresh water.

A recirculation pump may be included coupled with the one or more ballast water tanks. The recirculation pump may be coupled with a recirculation filter including one or more filter cartridges coated with the quaternary organosilane coating. The recirculation pump may be adapted to draw water from the one or more ballast water tanks through the recirculation filter and back into the one or more ballast water tanks.

The one or more ballast water tanks may further include an open-celled foam coated with the quaternary organosilane coating.

The open-celled foam may include a material selected from the group consisting of polymeric materials, stainless steel, copper, silicon, carbon, and silicon carbide.

The open-celled foam includes a range of pores per inch (PPI) between 10 PPI and 110 PPI.

The open-celled foam may include a surface area per gram less than a surface area per gram of one of filter sand and zeolite.

A surface of the one or more ballast tanks may be coated with the quaternary organosilane coating.

A ballast water treatment system may include an intake screen, a ballast water intake pump coupled to the intake screen, a screen filter coupled to an outlet of the ballast water intake pump, and a multi-cartridge filter system coupled to the screen filter and with one or more ballast tanks A ballast water dump pump may be coupled with the one or more ballast tanks. The multi-cartridge filter system may include two or more cartridge filters including a quaternary organosilane coating produced from a quaternary ammonium organosilane reagent having the formula:

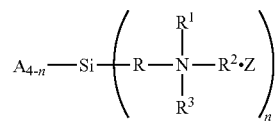

A may be a member independently selected from the group consisting of —$OR^4$, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; wherein $R^4$ may be a member selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; R may be substituted or unsubstituted alkylene; $R^1$, $R^2$, and $R^3$ may be members each independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl; and substituted or unsubstituted heteroaryl; Z may be a member selected from the group consisting of fluoride, chloride, bromide, iodide, tosylate, hydroxide, sulfate, and phosphate; and n may be 1, 2, or 3. The ballast water treatment system may be adapted to receive ballast water via the intake screen from a body of sea water including microorganisms and achieve at least a 95% reduction in a number of the microorganisms in the ballast water after a single pass through the multi-cartridge filter system.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
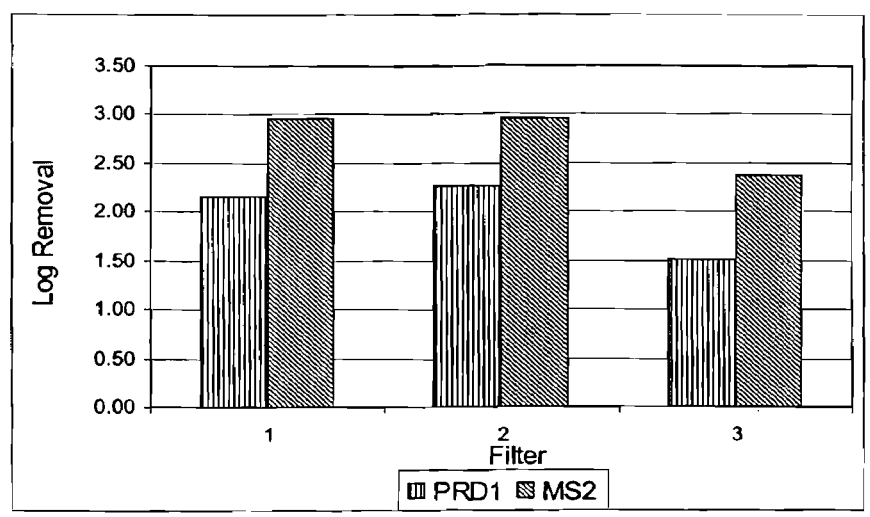
FIG. 1 illustrates the reduction in the viable number of bacteriophages by quaternary ammonium organosilane coated zeolite.
Figure 2:
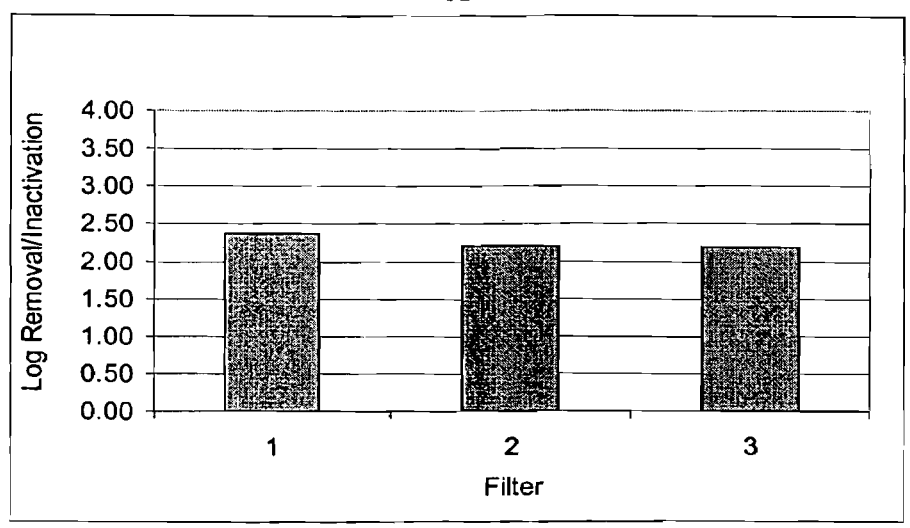
FIG. 2 illustrates the reduction in the viable number of (A) *K. terriena* bacteria and (B) *E. Coli* bacteria by quaternary ammonium organosilane coated zeolite.
Figure 2:
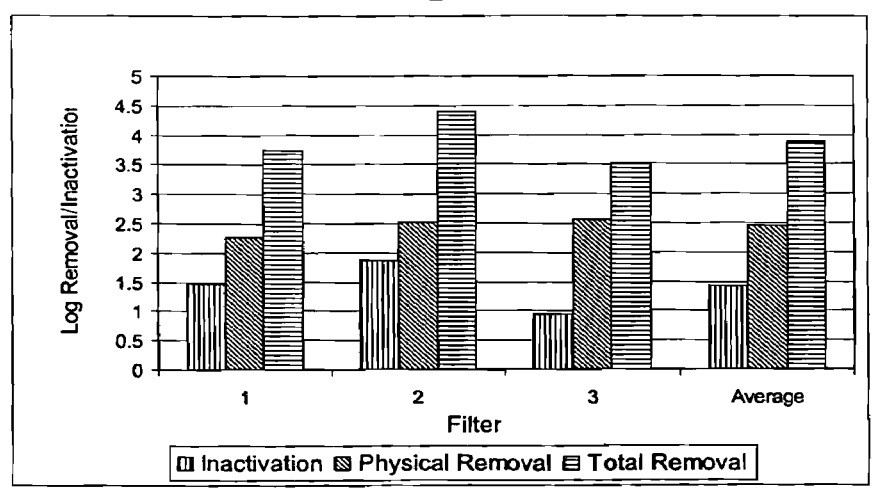
Figure 3:
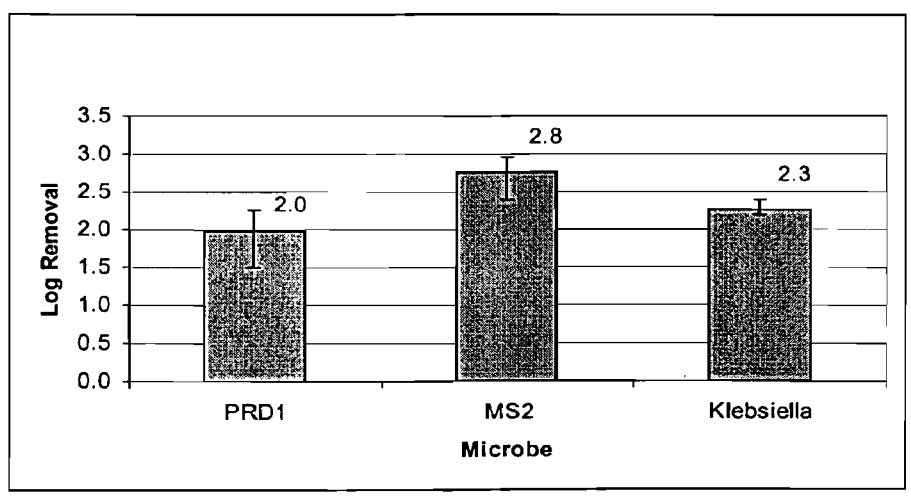
FIG. 3 illustrates the average reduction in the viable number of bacteria and bacteriophages by quaternary ammonium organosilane coated zeolite.

This disclosure, its aspects and implementations, are not limited to the specific components, assembly procedures or method elements disclosed herein. Many additional components, assembly procedures and/or method elements known in the art consistent with the intended static fluid disinfecting systems and related method implementations will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such static fluid disinfecting systems, and implementing components and methods, consistent with the intended operation and methods.

Definitions

As used herein, the term "reducing the viable number of microorganisms," means reducing the number of microorganisms capable of growing, working, functioning, and/or developing adequately. The term includes, for example, reducing the overall number of microorganisms, reducing the number of active microorganisms (i.e. inactivating microorganisms), reducing the number of microorganisms able to reproduce, reducing the number of intact microorganisms, reducing the number of infectious agents, removal of microorganisms, inactivation of microorganisms; and/or and the like. "Eliminating the viable number of microorganisms" means reducing the viable number of microorganisms to zero.

The term "microorganism," as used herein, means an organism that, individually, can only be seen through a microscope. The term microorganism includes, for example, bacteria, fungi, actinomycetes, algae, protozoa, yeast, germs, ground pearls, nematodes, viruses, prions, and algae.

The abbreviations used herein have their conventional meaning within the chemical and biological arts.

Where chemical groups are specified by their conventional chemical formulae, written from left to right, they equally encompass the chemically identical substituents that would result from writing the structure from right to left, e.g., —$CH_2O$— is equivalent to —$OCH_2$—.

The term "alkyl," by itself or as part of another substituent, means, unless otherwise stated, a straight (i.e. unbranched) or branched carbon chain containing at least one carbon, which may be fully saturated, mono- or poly-unsaturated. An unsaturated alkyl group is one having one or more double bonds or triple bonds. An "unsubstituted alkyl" refers to branched or unbranched alkyl groups wherein the backbone carbons are attached to hydrogen and/or other backbone carbon. The term "alkylene" refers to a divalent radical derivative of an alkyl.

A "backbone carbon" or "backbone heteroatom," as used herein, refers to a carbon or heteroatom, respectively, that is not at the point of attachment of an alkyl or heteroalkyl group, and which forms part of a branched or unbranched chain containing at least one carbon.

The term "alkoxy," refers to those alkyl groups attached to the remainder of the molecule via an oxygen atom.

The term "alkylether" refers to an alkyl having at least one carbon-oxygen-carbon linkage.

The term "hydroxy-substituted alkyl" refers to an alkyl having at least one attached hydroxyl group.

The term "amine-substituted alkyl" refers to an alkyl having at least one attached primary, secondary, or tertiary amine group.

The term "hetero alkyl," by itself or in combination with another term, means an alkyl having at least one heteroatom within the carbon chain. The heteroatom is selected from the group consisting of O, N, and S, wherein the nitrogen and sulfur atoms may optionally be oxidized and the nitrogen heteroatom may optionally be quaternized. The heteroatom(s) O, N, and S may be placed at any interior position of the heteroalkyl group or at the position at which the alkyl group is attached to the remainder of the molecule. Up to two heteroatoms may be consecutive, such as, for example, —$CH_2$—NH—$OCH_3$. Similarly, the term "heteroalkylene" by itself or as part of another substituent means a divalent radical derived from heteroalkyl. For heteroalkylene groups, heteroatoms can also occupy either or both of the chain termini.

An "unsubstituted heteroalkyl" refers to branched or unbranched heteroalkyl groups wherein the backbone carbons are attached to hydrogen, other backbone carbons, and/or backbone heteroatoms. The backbone heteroatoms are attached to hydrogen, backbone carbons, other backbone heteroatoms, and/or oxygen (in the case of oxidized sulfur).

The terms "cycloalkyl" and "heterocycloalkyl," by themselves or in combination with other terms, represent, unless otherwise stated, cyclic versions of "alkyl" and "heteroalkyl," respectively. Additionally, for heterocycloalkyl, a heteroatom can occupy the position at which the heterocycle is attached to the remainder of the molecule. The terms "cycloalkylene" and "heterocycloalkylene" refer to the divalent derivatives of cycloalkyl and heterocycloalkyl groups, respectively.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl.

The term "aryl" means, unless otherwise stated, a polyunsaturated, aromatic, hydrocarbon which can be a single ring or multiple rings (preferably from 1 to 3 rings) which are fused together or linked covalently. The term "heteroaryl" refers to aryl groups (or rings) that contain from one to four heteroatoms selected from N, O, and S, wherein the heteroatom occupies a ring vertex (also referred to herein as a "ring heteroatom"). The nitrogen and sulfur atoms are optionally oxidized, and the nitrogen atom(s) are optionally quaternized. A heteroaryl group can be attached to the remainder of the molecule through a carbon or heteroatom. The terms "arylene" and "heteroarylene" refer to the divalent derivatives of aryl and heteroaryl groups, respectively.

An "unsubstituted aryl" or "unsubstituted heteroaryl" refers to aryl and heteroaryl rings, respectively, in which the carbon atoms occupying ring vertices that are not at a point of attachment to the remainder of the molecule are attached only to hydrogen or other atoms occupying ring vertices. Heteroatoms occupying ring vertices that are not at a point of attachment to the remainder of the molecule are attached only to hydrogen, other atoms occupying ring vertices, or oxygen (in the case of oxidized ring heteroatoms).

The term "oxo" as used herein means an oxygen that is double bonded to a carbon atom.

A "liquid," as used herein, is a substance that flows freely, lacks crystal structure, and, unlike a gas, retains the same volume independent of the shape of its container at ambient temperature and pressure. An "aqueous liquid" refers to a liquid having a portion of water. Aqueous liquids suitable for the practice of the present invention include, for example, waste water and sewage water, fruit juices, milk, and medical fluids. Other suitable fluids will be readily determined by those skilled in the art and may be utilized in various implementations.

A "solid," as used herein, is a substance that does not dissolve in water at ambient temperature. Thus, a "solid phase carrier" is a carrier that is insoluble in water at ambient temperature.

Methods

In one aspect, the present invention provides a method of reducing or eliminating the viable number of microorganisms in a liquid. The method includes contacting the liquid with a solid phase carrier coated with a quaternary ammonium organosilane coating. The quaternary ammonium organosilane coating may reduce the viable number of microorganisms in a liquid by directly contacting the microorganisms.

A wide variety of solid phase carriers are useful in conjunction with the methods and compositions of the present invention. The solid phase carrier may be any appropriate dimension or shape, including, for example, a planar surface, the lining of tubing or pipe, or a roughly spherical particle. The solid phase carrier may also be any appropriate size, including, for example, a microscopic carrier, a carrier detectable with the naked eye, a roughly planar carrier with dimensions that are centimeters to meters in length, and roughly spherical carrier with a radius that is centimeters to meters in length.

The solid phase carrier is typically composed of one or more substance or material that is insoluble in liquid media (e.g. organic media, aqueous media, water, etc.). Exemplary materials include glass, silica, sand (e.g. manganese greensand and filter sand), quartz, flint, zeolite, anthracite, activated carbon, garnet, ilmenite, benn, aluminum (including non-hydrous aluminum silicate (e.g. filter AG), oxides of iron and titanium (e.g. ilmenite), diatomaceous earth, pozzolan (silicon/alumina material that occurs naturally and is produced as a byproduct of coal combustion), metal (e.g. tin), ceramic, and/or organic polymers and plastics (e.g. high density polyethylene (HDPE), polypropylene (PP) or polyvinyl chloride (PVC)).

In various implementations, the liquid is contacted with an additional solid phase carrier. The additional solid phase carrier may be coated with a different quaternary ammonium organosilane coating than the solid phase carrier. The additional solid phase carrier may also be composed of a different material than the solid phase carrier.

Quaternary Ammonium Organosilane Reagents

The solid phase carriers of the current invention are coated with a quaternary ammonium organosilane coating. The quaternary ammonium organosilane coating is produced from a quaternary ammonium organosilane reagent. The quaternary ammonium organosilane reagent has the formula:

Formula I

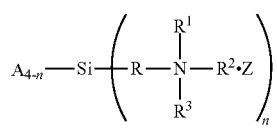

In Formula (I), A is selected from —$OR^4$, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl. Where more than one A is present, each A is independently selected from the groups recited above or below.

$R^4$ is selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl.

R is selected from substituted or unsubstituted alkylene, substituted or unsubstituted heteroalkylene, substituted or unsubstituted cycloalkylene, substituted or unsubstituted heterocycloalkylene, substituted or unsubstituted arylene, and substituted or unsubstituted heteroarylene.

$R^1$, $R^2$, and $R^3$ are independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl.

Z is selected from fluoride, chloride, bromide, iodide, tosylate, hydroxide, sulfate and phosphate.

The symbol n is 1, 2 or 3.

In an exemplary implementation, each substituted alkyl, substituted heteroalkyl, substituted cycloalkyl, substituted heterocycloalkyl, substituted aryl, and substituted heteroaryl described herein as possible A, $R^1$, $R^2$, $R^3$, and $R^4$ moieties are substituted only with at least one substituent independently selected from —OH, unsubstituted ($C_1$-$C_5$)alkyl, unsubstituted 2 to 5 membered heteroalkyl, unsubstituted ($C_5$-$C_7$) membered cycloalkyl, unsubstituted 5 to 7 membered heterocycloalkyl, unsubstituted aryl, and unsubstituted heteroaryl. For example, where A is a substituted ($C_1$-$C_{10}$)alkyl, the substituted ($C_1$-$C_{10}$)alkyl is substituted only with at least one substituent independently selected from —OH, unsubstituted ($C_1$-$C_5$)alkyl, unsubstituted 2 to 5 membered heteroalkyl, unsubstituted ($C_5$-$C_7$) membered cycloalkyl, unsubstituted 5 to 7 membered heterocycloalkyl, unsubstituted aryl, and unsubstituted heteroaryl.

In other implementations, each substituted alkyl, substituted heteroalkyl, substituted cycloalkyl, substituted heterocycloalkyl, substituted aryl, and substituted heteroaryl described herein as possible A, $R^1$, $R^2$, $R^3$, and $R^4$ moieties are substituted only with at least one substituent independently selected from —OH, unsubstituted ($C_1$-$C_5$)alkyl, unsubstituted 2 to 5 membered heteroalkyl, unsubstituted ($C_5$-$C_7$) membered cycloalkyl, unsubstituted 5 to 7 membered heterocycloalkyl, unsubstituted aryl, and unsubstituted heteroaryl. In other implementations, each substituted alkyl, substituted heteroalkyl, substituted cycloalkyl, substituted heterocycloalkyl, substituted aryl, and substituted heteroaryl described herein as possible A, $R^1$, $R^2$, $R^3$, and $R^4$ moieties are substituted only with at least one substituent independently selected from —OH, unsubstituted ($C_1$-$C_5$) alkyl, unsubstituted ($C_5$-$C_7$) membered cycloalkyl, and unsubstituted phenyl. In yet other implementations, each substituted alkyl, substituted heteroalkyl, substituted cycloalkyl, substituted heterocycloalkyl, substituted aryl, and substituted heteroaryl described herein as possible A, $R^1$, $R^2$, $R^3$, and $R^4$ moieties are substituted only with at least one unsubstituted ($C_1$-$C_3$)alkyl.

In another exemplary embodiment, each substituted alkylene, substituted heteroalkylene, substituted cycloalkylene, substituted heterocycloalkylene, substituted arylene, and substituted heteroarylene described herein as possible R moieties are substituted only with at least one substituent independently selected from —OH, unsubstituted ($C_1$-$C_5$)

alkyl, unsubstituted 2 to 5 membered heteroalkyl, unsubstituted ($C_5$-$C_7$) membered cycloalkyl, substituted 5 to 7 membered heterocycloalkyl, unsubstituted aryl, and unsubstituted heteroaryl.

In various implementations, each substituted alkylene, substituted heteroalkylene, substituted cycloalkylene, substituted heterocycloalkylene, substituted arylene, and substituted heteroarylene described herein as possible R moieties are substituted only with at least one substituent independently selected from —OH, unsubstituted ($C_1$-$C_5$) alkyl, unsubstituted 2 to 5 membered heteroalkyl, unsubstituted ($C_5$-$C_7$) membered cycloalkyl, unsubstituted 5 to 7 membered heterocycloalkyl, unsubstituted aryl, and unsubstituted heteroaryl. In other implementations, each substituted alkylene, substituted heteroalkylene, substituted cycloalkylene, substituted heterocycloalkylene, substituted arylene, and substituted heteroarylene described herein as possible R moieties are substituted only with at least one substituent independently selected from —OH, unsubstituted ($C_1$-$C_5$)alkyl, unsubstituted ($C_5$-$C_7$) membered cycloalkyl, and unsubstituted phenyl. In yet other implementations, each substituted alkylene, substituted heteroalkylene, substituted cycloalkylene, substituted heterocycloalkylene, substituted arylene, and substituted heteroarylene described herein as possible R moieties are substituted only with at least one unsubstituted ($C_1$-$C_3$)alkyl.

A may be selected from —$OR^4$, substituted or unsubstituted ($C_1$-$C_{10}$)alkyl, substituted or unsubstituted 2 to 12 membered heteroalkyl, substituted or unsubstituted ($C_5$-$C_7$) cycloalkyl, substituted or unsubstituted 5 to 7 membered heterocycloalkyl, substituted or unsubstituted aryl, and substituted or unsubstituted heteroaryl. $R^4$ may be selected from hydrogen, substituted or unsubstituted ($C_1$-$C_{10}$)alkyl, substituted or unsubstituted 2 to 10 membered heteroalkyl, substituted or unsubstituted ($C_5$-$C_7$)cycloalkyl, substituted or unsubstituted 5 to 7 membered heterocycloalkyl, substituted or unsubstituted aryl, and substituted or unsubstituted heteroaryl.

In some implementations, A is selected from —$OR^4$, unsubstituted ($C_1$-$C_{10}$)alkyl, unsubstituted 3 to 12 membered alkylether, unsubstituted ($C_5$-$C_7$)cycloalkyl, and unsubstituted phenyl.

A may also be selected from —$OR^4$, unsubstituted ($C^1$-$C^4$)alkyl, unsubstituted 3 to 8 membered alkylether, unsubstituted ($C^5$-$C^7$)cycloalkyl, and unsubstituted phenyl. Alternatively, A is selected from —$OR^4$, unsubstituted ($C_1$-$C_4$) alkyl, and unsubstituted 3 to 8 membered alkylether.

$R^4$ may be selected from hydrogen, unsubstituted ($C_1$-$C_{10}$)alkyl, unsubstituted 2 to 12 membered heteroalkyl, unsubstituted ($C_5$-$C_7$)cycloalkyl, unsubstituted 5 to 7 membered heterocycloalkyl, unsubstituted aryl, and unsubstituted heteroaryl.

In some implementations, $R^4$ is selected from hydrogen, unsubstituted ($C_1$-$C_{10}$)alkyl, unsubstituted 3 to 12 membered alkylether, unsubstituted ($C_5$-$C_7$)cycloalkyl, and unsubstituted phenyl. In a related embodiment, $R^4$ is selected from hydrogen, unsubstituted ($C_1$-$C_8$)alkyl, unsubstituted 3 to 8 membered alkyl ether, unsubstituted ($C_5$-$C_7$) cycloalkyl, and unsubstituted phenyl. Alternatively, $R^4$ is selected from hydrogen, unsubstituted ($C_1$-$C_8$)alkyl, and unsubstituted 3 to 8 membered alkyl ether.

$R^4$ may also be selected from phenyl, methylphenyl, substituted or unsubstituted ($C_1$-$C_8$)alkyl, and —$(CH_2)_x$—O—$(CH_2)_y CH_3$. X and y are integers independently selected from 1 to 10.

R may be selected from substituted or unsubstituted ($C_1$-$C_{10}$) alkylene, substituted or unsubstituted 2 to 10 membered heteroalkylene, substituted or unsubstituted ($C_5$-$C_7$)cycloalkylene, substituted or unsubstituted 2 to 7 membered heterocycloalkylene, substituted or unsubstituted arylene, and substituted or unsubstituted heteroarylene.

In various implementations, R is a member selected from unsubstituted ($C_1$-$C_{10}$)alkylene, unsubstituted 2 to 10 membered heteroalkylene, unsubstituted ($C_5$-$C_7$)cycloalkylene, unsubstituted 5 to 7 membered heterocycloalkylene, unsubstituted arylene, and unsubstituted heteroarylene.

R may also be unsubstituted ($C_1$-$C_{10}$)alkylene.

$R^1$, $R^2$, and $R^3$ may be selected from hydrogen, substituted or unsubstituted ($C_1$-$C_{20}$)alkyl, substituted or unsubstituted 2 to 20 membered heteroalkyl, substituted or unsubstituted ($C_5$-$C_7$)cycloalkyl, substituted or unsubstituted 5 to 7 membered heterocycloalkyl, substituted or unsubstituted aryl, and substituted or unsubstituted heteroaryl.

In some implementations, $R^1$, $R^2$, and $R^3$ are independently selected from hydrogen, unsubstituted ($C_1$-$C_{20}$)alkyl, hydroxy-substituted ($C_1$-$C_{20}$)alkyl, amine-substituted ($C_1$-$C_{20}$)alkyl, unsubstituted 2 to 20 membered heteroalkyl, unsubstituted ($C_5$-$C_7$)cycloalkyl, unsubstituted 5 to 7 membered heterocycloalkyl, unsubstituted aryl, and unsubstituted heteroaryl. In a related embodiment, $R^1$, $R^2$, and $R^3$ are independently selected from hydrogen, unsubstituted ($C_1$-$C_{20}$)alkyl, unsubstituted alkylether, hydroxy-substituted ($C_1$-$C_{20}$)alkyl, amine-substituted ($C_1$-$C_{20}$)alkyl, unsubstituted ($C_5$-$C_7$)cycloalkyl, and unsubstituted phenyl.

$R^1$, $R^2$, and $R^3$ may also be selected from hydrogen, unsubstituted ($C_1$-$C_{20}$)alkyl, unsubstituted alkylether, hydroxy-substituted ($C_1$-$C_{20}$)alkyl, amine-substituted ($C_1$-$C_{20}$)alkyl, unsubstituted ($C_5$-$C_7$)cycloalkyl, and unsubstituted phenyl. Alternatively, $R^1$, $R^2$, and $R^3$ are selected from hydrogen, unsubstituted ($C_1$-$C_{20}$)alkyl, unsubstituted alkylether, hydroxy-substituted ($C_1$-$C_{20}$)alkyl, and amine-substituted ($C_1$-$C_{20}$)alkyl.

In other exemplary embodiments, $R^1$, $R^2$, and $R^3$ are independently selected from —$(CH_2)_q OCH_3$, —$(CH_2)_q OH$, —$(CH_2)_q O(CH_2)_t CH_3$, —$(CH_2)_q NHCH_3$, —$(CH_2)_q NH_2$, —$(CH_2)_q N(CH_3)_2$ and —$(CH_2)_q NH_2(CH_2)_t CH_3$, in which q and t are integers independently selected from 0 to 10. $R^1$, $R^2$, and $R^3$ may also be independently selected from the group consisting of —$CH_2CH_2OCH_3$ and —$CH_2CH_2OCH_2CH_3$. Alternatively, $R^1$, $R^2$, and $R^3$ may also be independently selected from —$CH_2CH_2OH$ and —$CH_2CH_2CH_2CH(OH)CH_3$. $R^1$, $R^2$, and $R^3$ may also be independently selected from —$CH_2CH_2NH_2$ and —$CH_2CH_2N(CH_3)_2$. Finally, $R^1$, $R^2$, and $R^3$ may be members independently selected from methyl, octadecyl, didecyl, and tetradecyl.

In an exemplary embodiment, the quaternary ammonium organosilane reagent is selected from $(CH_3O)_3Si(CH_2)_3N^+(CH_3)_2(C_{18}H_{37})$ ($Cl^-$); $(CH_3CH_2O)_3Si(CH_2)_3N^+(CH_3)_2(C_{18}H_{37})$ ($Cl^-$); $(CH_3O)_3Si(CH_2)_3N^+(CH_3)_2(C_{18}H_{37})$ ($Br^-$); $(CH_3O)_3Si(CH_2)_3N^+(C_{10}H_{21})_2(CH_3)$ ($Cl^-$); $(CH_3O)_3Si(CH_2)_3N^+(CH_3)_2(C_{14}H_{29})$ ($Cl^-$); $(CH_3O)_3Si(CH_2)_3N^+(CH_3)_2(C_{14}H_{29})$ ($Br^-$); and $(CH_3O)_3Si(CH_2)_3N^+(CH_3)_2(C_{16}H_{33})$ ($Cl^-$). In a related embodiment, the quaternary ammonium organosilane reagent is selected from 3-(trimethoxysilyl)propyldimethyloctadecyl ammonium chloride, 3-(trimethoxysilyl)propyldidecylmethyl ammonium chloride, and 3-(trimethoxysilyl)propyldimethyltetradecyl ammonium chloride.

In another exemplary embodiment, the quaternary ammonium organosilane contains an ammonium halide and a hydrolyzable alkoxy group bonded to silicon.

Quaternary Ammonium Organosilane Coatings

A variety of methods may be used to form the quaternary ammonium organosilane coatings from quaternary ammonium organosilane reagents. The quaternary ammonium organosilane reagent may be applied to the solid phase carrier using any method known in the art, including, for example, methods for covalently or non-covalently binding the quaternary ammonium organosilane reagent to the solid phase carrier to form a quaternary ammonium organosilane coating.

Solid phase carriers may be contacted (e.g. sprayed, dipped, or otherwise applied) with a solution preparation containing the quaternary ammonium organosilane reagent. In some embodiments, the quaternary ammonium organosilane reagent coated surfaces are allowed to air dry at room temperatures for a sufficient period of time to complete a condensation cure of the quaternary ammonium organosilane coating. Alternatively, heat is applied to the coated surfaces for a sufficient period of time to effect cure, the duration and temperature of such is known to those skilled in the art.

In various implementations, the quaternary ammonium organosilane reagent is covalently bound to the solid phase carrier. Typically, the quaternary ammonium organosilane reagent is covalently bound to an accessible carrier reactive group that forms a part of the solid phase carrier. A variety of reactive groups are useful in covalently binding the quaternary ammonium organosilane reagent. The quaternary ammonium organosilane reagent may be covalently bound to the carrier reactive group through the silane moiety of the quaternary ammonium organosilane reagent. The silane moiety, as used herein, refers to the $A_{4-n}$—Si-portion of the compound Formula I.

The silane moiety may be covalently bound to the carrier reactive group by allowing the carrier reactive group to covalently bind to the silicon atom of the silane moiety. For example, where the carrier reactive group is a hydroxyl, the oxygen atom may be allowed to bind to the silicon atom to form a silicon-oxygen bond thereby covalently attaching the quaternary ammonium organosilane reagent to the carrier molecule. In a related embodiment, the silane moiety includes at least one —OR$^4$ that leaves upon attack of a hydroxyl carrier reactive group. This reaction may be referred to herein as a condensation reaction. Thus, the quaternary ammonium organosilane reagent may be covalently attached to the carrier molecule via a condensation reaction.

The silane moiety may also include an A group that contains a reactive group, referred to herein as a silane reactive group. The silane reactive group is capable of reacting with a carrier reactive group to form a covalent bond.

Silane reactive groups, carrier reactive groups and classes of reactions useful in covalently attaching quaternary ammonium organosilane reagents to a solid phase carrier are generally those that are well known in the art of bioconjugate chemistry. These include, but are not limited to nucleophilic substitutions (e.g. reactions of amines and alcohols with acyl halides, active esters), electrophilic substitutions (e.g., enamine reactions) and additions to carbon-carbon and carbon-heteroatom multiple bonds (e.g., Michael reaction, Diels-Alder addition). These and other useful reactions are discussed in, for example, March, *Advanced Organic Chemistry*, 3rd Ed., John Wiley & Sons, New York, 1985; Hermanson, *Bioconjugate Techniques*, Academic Press, San Diego, 1996; and Feeney et al., *Modification Of Proteins*; Advances in Chemistry Series, Vol. 198, American Chemical Society, Washington, D.C., 1982 the disclosures of which are hereby incorporated herein entirely by reference.

Useful silane and carrier reactive functional groups include, for example:

(a) carboxyl groups and various derivatives thereof including, but not limited to, N-hydroxysuccinimide esters, N-hydroxybenztriazole esters, acid halides, acyl imidazoles, thioesters, p-nitrophenyl esters, alkyl, alkenyl, alkynyl and aromatic esters;

(b) hydroxyl groups which can be converted to esters, ethers, aldehydes, etc.;

(c) haloalkyl groups wherein the halide can be later displaced with a nucleophilic group such as, for example, an amine, a carboxylate anion, thiol anion, carbanion, or an alkoxide ion, thereby resulting in the covalent attachment of a new group at the site of the halogen atom;

(d) dienophile groups which are capable of participating in Diels-Alder reactions such as, for example, maleimido groups;

(e) aldehyde or ketone groups such that subsequent derivatization is possible via formation of carbonyl derivatives such as, for example, imines, hydrazones, semicarbazones or oximes, or via such mechanisms as Grignard addition or alkyllithium addition;

(f) sulfonyl halide groups for subsequent reaction with amines, for example, to form sulfonamides;

(g) thiol groups, which can be converted to disulfides or reacted with acyl halides;

(h) amine or sulfhydryl groups, which can be, for example, acylated, alkylated or oxidized;

(i) alkenes, which can undergo, for example, cycloadditions, acylation, Michael addition, etc.;

(j) epoxides, which can react with, for example, amines and hydroxyl compounds; and (k) phosphoramidites and other standard functional groups useful in nucleic acid synthesis.

The reactive functional groups can be chosen such that they do not participate in, or interfere with, the reactions necessary to assemble the quaternary ammonium organosilane coating. Alternatively, a silane or carrier reactive functional group can be protected from participating in the reaction by the presence of a protecting group. Those of skill in the art will understand how to protect a particular functional group from interfering with a chosen set of reaction conditions. For examples of useful protecting groups, See Greene et al., *Protective Groups In Organic Synthesis*, John Wiley & Sons, New York, 1991, the disclosure of which is incorporated entirely herein by reference.

Linkers may also be employed to attach the quaternary ammonium organosilane reagent to the solid phase carrier. Linkers may include reactive groups at the point of attachment to the quaternary ammonium organosilane reagent and/or the solid phase carrier. Any appropriate linker may be used in the present invention, including substituted or unsubstituted alkylene, substituted or unsubstituted heteroalkylene, substituted or unsubstituted cycloalkylene, substituted or unsubstituted heterocycloalkylene, substituted or unsubstituted arylene, and substituted or unsubstituted heteroarylene. In an exemplary embodiment, the linker group is selected from substituted or unsubstituted alkylene, and substituted or unsubstituted heteroalkylene. In a related embodiment, the linker is selected from unsubstituted alkylene, alkylene substituted with at least one oxy, unsubstituted heteroalkylene, and heteroalkylene substituted with at least one oxy. In another related embodiment, the linker is selected from unsubstituted ($C_1$-$C_{25}$) alkylene, ($C_1$-$C_{25}$) alkylene substituted with at least one oxy, unsubstituted 2 to 26 membered heteroalkylene, and 2 to 26 membered heteroalkylene substituted with at least one oxy.

Other useful linkers include those having a polyester backbone (e.g. polyethylene glycol), and derivatives thereof. A wide variety of useful linkers are commercially available (e.g. polyethylene glycol based linkers such as those available from Nektar, Inc. of Huntsville, Ala.).

The quaternary ammonium organosilane reagent may also be non-covalently attached to the solid phase carrier using any interaction, such as Van der Waals interactions, hydrophobic interactions, dipole-dipole interactions, electrostatic interactions, and/or hydrogen bonding interactions.

In an exemplary embodiment, the quaternary ammonium organosilane reagent forms a polymeric network that partially or wholly covers the solid phase carrier. Where the quaternary ammonium organosilane reagent forms a polymeric network, the quaternary ammonium organosilane reagent may additionally from a covalent and/or non-covalent bond with the solid phase carrier.

The quaternary ammonium organosilane reagent typically forms a polymeric network by covalently binding through the silane moiety. Where the silane moiety includes at least one $—OR^4$ group, the quaternary ammonium organosilane reagent may form a silicone polymer having a series of silicon-oxygen-silicon bonds. The silicones may be linear polymers or cross-linked polymers. For example, where the silane moiety includes at least two $—OR^4$ groups, the quaternary ammonium organosilane reagent may form a cross-linked silicone polymer wherein each silica atom forms part of at least two silicon-oxygen-silicon bonds. Thus, polymerization may be achieved using silane reactive groups capable of forming intermolecular covalent bonds with other silane reactive groups.

In an exemplary embodiment, the quaternary ammonium organosilane reagent is contacted with an aqueous liquid prior to application to the solid phase carrier. As discussed above, useful quaternary ammonium organosilane reagents include those containing hydrolyzable alkoxy groups bound to the silicon atom. Upon contact with a water molecule, the alkoxy groups (e.g. methoxy) may hydrolyze to form hydroxy substituted silicon atoms (also referred to herein as "silanols") with simultaneous liberation of alcohol as a by-product of the hydrolysis (also referred to herein as condensation). The resultant compound formed on addition of quaternary ammonium organosilanes of the above compositions are the corresponding mono-, di-, or tri-silanol species. The reactive silanol species prepared upon hydrolysis may form covalent silicon-oxygen-silicon bonds with other silanol species resulting in polymeric coatings as described above. The resultant polymeric coating may be a molecular network non-covalently and/or covalently bonded to the solid phase carrier.

It will be understood by those skilled in the art that the quaternary ammonium organosilane coating may form three dimensional, cross-linked, water-insoluble, polymeric coatings which may contain some uncondensed silanol or alkoxy moieties. Monomeric, dimeric and oligomeric species may be present on the solid phase carrier following application of an aqueous solution containing quaternary ammonium organosilane reagent, and these may bond to the solid phase carrier, whether by covalent or non-covalent mechanisms.

The quaternary ammonium organosilane coatings formed on the solid phase carriers retain their antimicrobial activity. They are substantive to the solid phase carriers and largely insoluble in aqueous liquid. For example, in some embodiments, less than 10 ppb of quaternary ammonium organosilane reagents is detectable in water after Standard 42 testing as performed by NSF International, Ann Arbor, Mich.

In an exemplary embodiment, the quaternary ammonium organosilane coating has the formula:

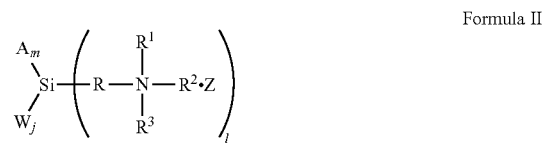

Formula II

In Formula II, A, R, $R^1$, $R^2$, and $R^3$ are as defined above in Formula I. W is a solid phase carrier as described above. The solid phase carrier W may include a linker moiety and/or the remnant of a reactive group. The symbol 1 represents an integer selected from 1, 2, or 3. The symbols m and j represent integers independently selected from 0, 1, 2, and 3, wherein both m and j are not simultaneously 0. The sum of m, j, and 1 is not greater than four. In a related embodiment, 1 is 1, 2, or 3; m is 1, 2, or 3, and j is 1, 2, or 3. In another related embodiment, 1 is 1; m is 1, 2, or 3, and j is 1, 2, or 3.

Microorganisms

The term "microorganism," as used herein, means an organism that, individually, can only be seen through a microscope. The term microorganism includes, for example, bacteria, fungi, actinomycetes, algae, protozoa, yeast, germs, ground pearls, nematodes, viruses, prions, and algae. Thus, in an exemplary embodiment, the microorganism is selected from bacteria, viruses (also referred to herein as bacteriophages), fungi, algae, mold, yeast, spores, and protozoa parasites. The term "bacteria" includes both gram positive and gram negative bacteria.

Gram positive bacteria include, for example, *Bacillus* sp. (vegetative cell), *Corynebacterium diptheriae*, *Micrococcus lutea*, *Micrococcus* sp., *Mycobacterium tuberculosis*, *Mycobacterium smegmatis*, *Propionibacterium acnes*, *Staphylococcus aureus*, *Staphylococcus epidermidis*, *Streptococcus faecalis*, *Streptococcus mutans*, *Streptococcus pneumonia*, and *Streptococcus pyogenes*.

Gram negative bacteria include, for example, *Acinetobacter calcoaceticus*, *Aeromonas hydrophilia*, *Citrobacter deversus*, *Citrobacter freundi*, *Enterobacter aerogenes*, *Enterobacter aglomera*, *Escherichia coli*, *Klebsiella oxytoca*, *Klebsiella pneumoniae*, *Klebsiella terriena*, *Legionella pneumophila*, *Morganella morganii*, *Proteus mirabilis*, *Proteus vulgaris*, *Pseudomonas aeruginosa*, *Pseudomonas fluorscens*, *Salmonella cholera suis*, *Salmonella typhi*, *Salmonella typhimurium*, *Serratia liquifaciens*, and *Xanthomonas campestris*.

Viruses include, for example, Adenovirus Type II & IV, Bovine Adenovirus Type I & IV, Feline pneumonitis, Herpes Simplex Type I, Herpes Simplex Type II, HIV-1 (AIDS), Influenza A2 (Aichi), Influenza A2 (Asian), Influenza B, Mumps, Parinfluenza (Sendai), Reovirus Type I, Simian Virus 40, Vaccinia, MS2, T2 (non-enveloped virus) and PRD1.

Fungi, algae, mold, yeast, and spores include, for example, *Alterania alternate*, *Aspergillus flavus*, *Aspergillus niger*, *Aspergillus sydowii*, *Aspergillus terreus*, *Aspergillus versicolor*, *Aspergillus verrucaria*, *Aureobasidium pullans*, *Candida albicans*, *Candida pseudotropocalis*, *Chaetomium globsum*, *Cladosporium cladosporioides*, *Chlorella vulgaris*, *Dreschslera australiensis*, *Epidermophyton* sp., *Gliomasta cerealis*, *Gloeophyllum trabeum*, *Microsporum* sp., *Microsporum audouinii, Monilia grisea, Oscillatoria, Penicillium chrysogenum, Pencillium commune, Penicillium funiculosum, Penicillium pinophiliumm, Penicillium variable, Phoma fimeti, Pithomyces chartarum, Poria placenta, Scenedesmus, Saccharonyces cerevisiae, Scolecobasidium humicola, Trichoderma viride, Trichophyton interdigitale, Trichophyton maidson, Trichophyton mentogrophytes,* and *Trichophyton* sp.

Protozoa parasites include, for example, *Cryptosporidium parvum* (oocysts) and *Giardia*.

For more detailed information regarding antimicrobial activity against gram positive bacteria, gram negative bacteria, viruses, fungi, algae, mold, yeast, spores and protozoa parasites, see Hsiao, Y. Chinese Pat. Appl., PCT/CN98/00207 (1998); Malek, J. et at., U.S. Pat. No. 4,259,103 (1981); Klein, S., U.S. Pat. No. 4,394,378 (1983); Eudy, W., U.S. Pat. No. 4,406,892 (1983); Gettings, R. et al., U.S. Pat. No. 4,908,355 (1990) and U.S. Pat. No. 5,013,459 (1991); Blank, L. et al., U.S. Pat. No. 5,145,596 (1992); Avery, R. U.S. Pat. No. 5,411,585 (1995); Blank, L. et al., U.S. Pat. No. 4,865,844 (1989); Battice, D. et al., U.S. Pat. No. 4,631,297 (1986); Higgs, B. et al., U.S. Pat. No. 5,359,104 (1994); Avery, R et al., U.S. Pat. No. 5,411,585 (1995); White, W. et al., *Book of Papers, 12th Annual Nonwovens Tech. Symposium*, pp. 13-46 (1984); McGee, J. et al, *Am. Dyestuff Rep.* 6: 56-59 (1983); Dow Corning Technical Brochure; 22-994-83 (1983); Gettings, R. et al., *Book of Papers, American Association of Textile Chemists and Colorists National Technical Conference*, pp. 259-261 (1978); Dow Corning Technical Brochure, 24-095-85 (1985); Tsao, I. et al., *Biotechnol. Bioeng.*, 34: 639-46 (1989); Tsao, I et al., *ACS Symp. Ser.* 419: 250-67 (1990); Klein, M. et al, *Principles of Viral Inactivation*, 3$^{rd}$ Ed., S. Block, Ed., (Lea & Febiger, Philadelphia, Pa.) pp. 422-434 (1983); Peterson, W. et al, U.S. Pat. No. 6,613,755; each of which is incorporated entirely by reference herein.

Conventional quaternary ammonium organosilanes are available as 42% active material in methanol under the trademark DOW CORNING® 5700 (3-(trimethoxy-silyl) propyldimethyloctadecyl ammonium chloride) by Aegis Environmental Management, Inc. of Midland, Mich. and Requat 1977 (3-(trimethoxysilyl)-propyldidecylmethyl ammonium chloride) by Sanitized Inc. of New Preston, Conn. Octadecyldimethyl(3-trimethoxysilylpropyl) ammonium chloride (Cat. No. SI06620.0) as a 60% active solution in methanol, tetradecyldimethyl(3-trimethoxysilylpropyl) ammonium chloride (Cat. No. SIT7090.0) as a 50% solution in methanol and didecylmethyl(3-trimethoxysilylpropyl) ammonium chloride (Cat. No. SID3392.0) as a 42% solution in methanol are offered by Gelest, Inc. of Tullytown, P A. They are often applied from solvent solutions such as lower alcohols.

EXAMPLES

The following examples are provided by way of illustration only and not by way of limitation. Those of skill in the art will readily recognize a variety of non-critical parameters that can be changed or modified to yield similar results.

ODTA: Octadecyldimethyl(3-trimethoxysilyl)propyl ammonium chloride. Obtained from Wright Chemical Corp., Wilmington, N.C. as a 42% active material in methanol. This material may also be named as 3-(trimethoxysilyl) propyl-dimethyloctadecyl ammonium chloride. Also available as a 42% active material from Aegis Environmental Management, Inc., Midland, Mich. marketed as DOW CORNING® 5700.

REQUAT: 3-(trimethoxysilyl)propyldidecylmethyl ammonium chloride. Obtained from Sanitized Inc., New Preston, Conn.; Requat 1977 as a 42% active material in methanol.

TDTA: 3-(trimethoxysilyl)propyltetradecyldimethyl ammonium chloride obtained from Gelest, Inc., Tullytown, P A, Cat. No. SIT7090.0 as a 50% solution in methanol.

Example 1

A solution suitable for application was prepared by adding 4 parts ODTA to 100 parts deionized water with stirring. The resulting clear solution was applied to an open, polyvinyl chloride (PVC) flat-type evaporation pan by atomized spray, insuring that all surfaces were thoroughly wetted. The pan is allowed to air dry for 24 hours to cure the quaternary ammonium organosilane reagents to the container surface to form a quaternary ammonium organosilane coating. Water containing bacteria level previously measured at $10^7$ total bacteria/ml using a BIOSPERSE® Test Kit was added to the pan in a ratio of 4.6 grams of water per square inch of surface area. After 30 minutes the water is sampled using a BIOSPERSE® test kit. After incubation, $10^5$ bacteria/ml was measured. Resampling of the test water at 1 hour and 4 hours gave bacterial counts of $10^4$ and $<10^3$, respectively.

Example 2

A 4 oz. solution prepared according to Example 1 was added to a 1 pint tin-plated metal test container having ¾ inch screw top. The solution was agitated to completely wet the inside surface of the container for 1 minute and then decanted. The test container was allowed to air dry for one hour. Residual vapors were removed by an air purge for 5 minutes and the container was then heated to 105° C. for one hour to cure the quaternary ammonium organosilane reagents to the container surface to form a quaternary ammonium organosilane coating. Water (300 g) having a high bacterial count of $10^7$ bacteria/ml was added to the test container. The test container was allowed to stand one hour at room temperature. After two hours, the test water bacterial level was measured at $10^3$ bacteria/ml using a BIOSPERSE® test kit.

Example 3

Two ounce containers of glass, high density polyethylene (HDPE), polypropylene (PP) or polyvinyl chloride (PVC) were treated with an aqueous solution containing 1.5% TDTA. The containers were heated to 100 C for one hour to cure the quaternary ammonium organosilane reagent to the container surfaces to form a quaternary ammonium organosilane coating. Each container was then rinsed with one oz. of deionized water. One ounce of water containing $10^5$ bacteria/ml was added to each container and capped. After 24 hours at room temperature, each container was sampled and bacteria measured with a BIOSPERSE® test kit. All containers indicated bacteria counts of $10^3$ bacteria/ml following incubation for 24 hours.

Example 4

Coiled aluminum test tubing 8 ft. in length and having an internal diameter of ¼ inch was treated with a solution of 8 parts REQUAT to 100 parts isopropanol. The tube was filled with the solution, sealed and allowed to stand for 15 minutes. The tube was drained and air dried with a stream of compressed air passing through the tube at a rate of 100 ml/minute for 24 hours to cure the quaternary ammonium organosilane reagent to the tubing surfaces to form a quaternary ammonium organosilane coating. An aqueous liquid containing $10^7$ units/ml of bacteria and algae was passed through the coiled aluminum tubing. The aqueous liquid was gravity circulated through the tubing at a rate of 5 ml/minute resulting in contamination of <$10^3$ bacteria/ml.

Example 5

Figure 4:
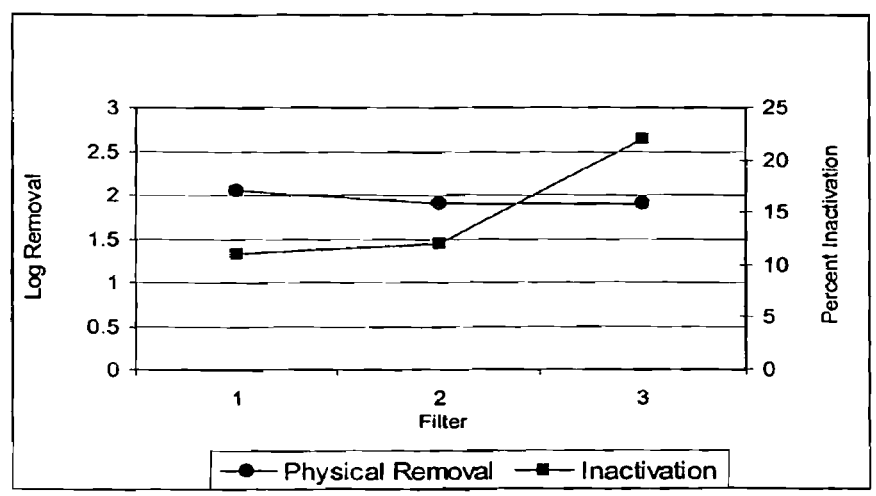
FIG. 4 illustrates the reduction in the viable number of algae by quaternary ammonium organosilane coated zeolite.

An antimicrobial solution suitable for treatment of silicaeous surfaces including sand and zeolites was prepared by adding 67.5 grams REQUAT to a stirred solution containing 3.375 kg deionized water and 3 grams of 3-aminopropyltrimethoxysilane. One kg of the clear solution was sprayed onto 50 pounds of #20 white silica pool filter sand over 5 minutes in a rotary mixer. The wetted material was mixed with agitation for an additional hour and allowed to air dry 24 hrs to cure the quaternary ammonium organosilane reagent to the sand surface to form a quaternary ammonium organosilane coating. The treated sand was employed in a recirculating water system to reduce microbial contamination from $10^7$ bacteria/ml to <$10^3$ bacteria/ml in 30 minutes of operation as measured by a BIOSPERSE® test kit.

Example 6

Zeolites containing approximately 90% clinoptilolite (Ash Meadows Zeolites, LLC) of 20-40 mesh were thoroughly wetted with a solution containing 7 parts ODTA and 93 parts water. The wet zeolites were allowed to air dry 24 hours and then heated 2 hours at 110° C. in a forced air oven to cure the quaternary ammonium organosilane reagent to the zeolite surfaces to form a quaternary ammonium organosilane coating. The treated zeolites were placed in a 2 inch PVC pipe having an overall length of 38 inches. As described below, dechlorinated water containing known quantities of bacteriophages, bacteria, algae and protozoa were passed through the PVC pipe containing the quaternary ammonium organosilane coated zeolites.

The experimental apparatus consisted of a set of three filters (filter 1, 2 and 3) attached to a manifold, which included fittings for hose connections, and sample ports at the inlet and outlet for each filter (see FIG. 6). An inline mixer was included in the pipe assembly before inlet port to maximize microbial monodispersity. The challenge test water was pumped into each filter at a flow rate of 330 ml/min using a thermally protected pump.

Prior to each microbial challenge, the filters were flushed for 25 minutes with dechlorinated tap water. The flush water was dechlorinated using granular activated carbon filter and chlorine residual was measured before and after the dechlorination using Hach method 8167.

The challenge test water was prepared by adding known number of microorganisms into 20 liters of dechlorinated tap water in a polypropylene container (Nalgene, Rochester, N.Y.). Microbes were washed with 1× phosphate buffered saline just before spiking in the container. The challenge test water container was placed on a stir plate with a Teflon coated stir bar and continuously mixed to provide homogenous distribution of microbes in the influent water. The challenge test water was pumped into each filter using a thermally protected pump (Little Giant Potent Pump, Oklahoma City, Okla.). The pump was primed prior to use by recirculating the microbial stock solution. The hose was connected to the inlet fitting of each filter. The pump was operated for twelve minutes for each filter. The flow rate was measured using a 1000 ml graduated cylinder and adjusted to 330 ml/min as recommended by CSL. Based on the hydraulic parameters of the system, each filter needed a 12-minute-run to stabilize. The effluent samples were taken from each filter after twelve minutes and a single influent sample was collected from the second filter after eight minutes, which represented influent concentration for the complete run. Once the experiment was complete, the filters were again flushed for 30 minutes with dechlorinated tap water.

Example 6.1 Bacteriophages

A series of experiments were conducted with the bacteriophages MS2 and PRD1. The effluent and influent samples were taken and diluted as described above. The samples for MS2 and PRD1 were serially diluted and assayed using their respective bacterial hosts by double layer agar method (Adams, M. H., *Bacteriophages*, Interscience, New York (1959)). The plates were incubated at 37 C for 24 hours, at which time clear virus plaques were counted. The results are presented in FIG. 1. The log removal and inactivation for MS2 and PRD1 ranged between 2.40 to 2.96, and 1.50 to 2.27 log, respectively. The over average removal for MS2 and PRD1 were 2.8 and 2.0 log, respectively. The data shows that quaternary ammonium organosilane coated zeolite can reduce the viable number of bacteriophages in aqueous liquid.

Example 6.2 Bacteria

An independent series of experiments were conducted with the bacteria *Klebsiella terriena* and *E. Coli* (ATCC 25922). The effluent and influent samples were taken and diluted as described above. The samples were assayed by membrane filtration techniques using 0.4 μm pore size membrane filter. The membrane filter was placed on a selective medium and incubated at 37 C for 24 hours, at which time bacterial colonies were counted. The results are presented in FIGS. 2(A) and (B). As shown in FIG. 2(A) and FIG. 3, consistent removal for *Klebsiella* was observed in all the filters, which ranged from 99.37% (2.2 log) to 99.60% (2.4 log) with an average of 99.50% (2.3 log). As shown in FIG. 2(B), the removal for *E. coli* ranged from 99.96% (3.50 log) to 99.99% (4.39 log) with an average of 99.98% (3.88 log). This study shows that quaternary ammonium organosilane coated zeolite can effectively reduce the viable number bacteria in aqueous liquid.

Example 6.3 Algae

Experiments were conducted with *Chorella vulgaris* to determine both the removal as well as inactivation effects of the media against algae. The effluent and influent samples were taken and diluted as described above. The samples were concentrated by centrifugation before assaying for total removal and inactivation. Removal was determined by total volumetric counts under microscope. The inactivation rate was determined by viability test. The algal cells were digested with 2% trypsin (in hanks balanced salt solution) and stained with Fluorescein Diacetate (Sigma Chemicals F-7378). Fluorescein Diacetate (FDA) is a non-polar ester that passes through cell membranes. Once inside the cell, FDA is hydrolyzed by esterases (an enzyme present in viable cells) to produce fluorescein, which accumulates inside viable cell walls and fluoresce under UV light. A microscope equipped with both white and ultraviolet light, was used to quantify live and dead algal cells. The results are presented in FIG. 4. The average removal of 99.11% (2.05 log), 98.74% (1.90 log) and 98.74% (1.90 log) were observed for filter 1, 2, and 3, respectively. The average of three inactivation measurements for filter 1, 2, and 3 were 11% (0.05%), 12% (0.06 log) and 22% (0.11 log), respectively. However, based on individual measurements the overall range of inactivation for the three filters was 5% (0.02 log) to 46% (0.27 log) and averaged at 15% (0.07 log). It is clear that quaternary ammonium organosilane coated zeolite can effectively reduce the viable number of algae in aqueous liquid.

Example 6.4 Protozoa Parasites

Figure 5:
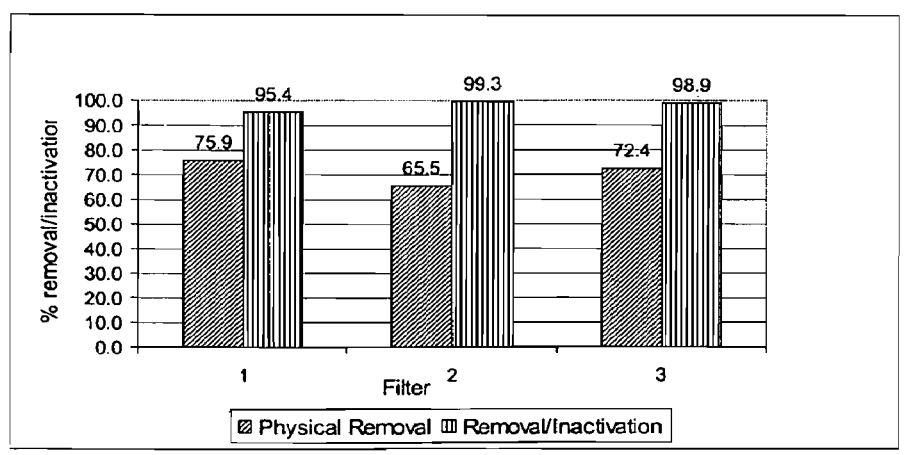
FIG. 5 illustrates the reduction in the viable number of protozoa parasites by quaternary ammonium organosilane coated zeolite.
Figure 6:
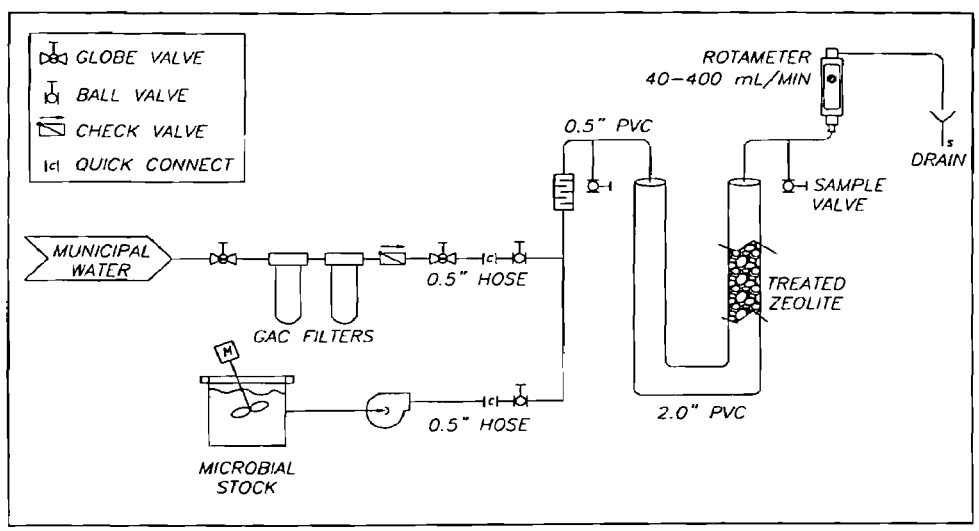
FIG. 6 illustrates an experimental apparatus containing a column packed with quaternary ammonium organosilane coated zeolite for use in decreasing the viable number of microorganisms in a liquid.

*Cryptosporidium parvum* oocysts were obtained from the Sterling Parasitology Laboratory at the University of Arizona, Tucson, Ariz., and were used to determine the efficacy of removal or inactivation of infectious oocysts. The removal of *Cryptosporidium parvum* oocysts was determined by Hemacytometer counts on concentrated samples, whereas, the number of infectious oocysts were determined by infection foci detection method using cell culture technique with the most-probable-number assay (FDM-MPN) (Slifko et al., *Applied Environmental Microbiology*, 65:3936-3941 (1999)). The results are presented in FIG. 5.

The cumulative removal/inactivation of infectious *C. parvum* oocysts averaged at 97.9% (1.68 log) for all three filters. The removal and inactivation performance by each filter were 95.4% (1.34 log), 99.3% (2.15 log), and 98.9% (1.96 log) for filters 1, 2, and 3, respectively. The removal (only) of oocysts averaged at 71.3% (0.54 log) with an individual removal of 75.9% (0.62 log), 65.5% (0.46 log), and 72.4% (0.56) for filters 1, 2, and 3, respectively. The study indicates that quaternary ammonium organosilane coated zeolite can effectively reduce the viable number pf protozoa parasites in aqueous liquid.

Open Cell Substrates

Various implementations of static fluid disinfecting systems my utilize open-cell (reticulated) foams (both synthetic and natural). In particular implementations, by non-limiting example, the open-cell foam (foam) is composed of one or more cells with structures of, by non-limiting example, tetrakaihedral, fullerene ("bucky-ball"), dodecahedron, tetrakaidecahedron, Weaire-Phelan structures, honeycomb, bitruncated cubic honeycomb (Kelvin structure), octahedral, any combination of the foregoing, and any other polyhedral shape. Implementations utilizing Weaire-Phelan structures may incorporate any of the structures disclosed in D. Weaire et al., "A Counter-Example to Kelvin's Conjecture on Minimal Surfaces," *Phil. Mag. Let.* 69:107-110 (1994), the disclosure of which is incorporated herein entirely by reference. The open-cell foams form an interconnected network of solid struts. In particular implementations, the foam cells are arranged like soap suds, forming a three dimensional, packed array of similarly sized bubble-like structures. These structures may have theoretically maximum volume and minimal surface area for a given volume. When filled with liquid, the resulting structure is similar to an interpenetrating network of polymers.

Foams containing any of the above structures are available in a variety of pore structures as measured in pores per inch (PPI). In various implementations, the pore size in PPI may range from about 10 to about 110. In particular implementations, the pore size may be about 20 to about 40 PPI. In other implementations, the pore size may be 30 PPI and lower. It has been observed that, as the pore size decreases above 110 PPI that the speed and effectiveness of the disinfection decreases. In various open-cell foam materials such as natural open cell foam materials such as sponges, the actual cell size may vary significantly throughout the material (they may have an average PPI within this ranges above), but will also perform in this application following treatment with organosilane quaternary compounds. In various implementations, the open-cell foams are compressible structures and will conform to the shape of the container when suitably sized. In particular implementations, the foam will displace less than about 5% of the liquid volume enclosed in a container when the foam is dimensioned to fill substantially the entire volume of the container. After treatment with organosilane quaternary compounds, the treated foam may be compressed to less than about 25% of their original volume without observable loss of antimicrobial activity.

Foams utilized in implementations of static fluid disinfecting systems disclosed herein may be made of materials including plastics, polymeric materials, stainless steel, copper, silicon, carbon and silicon carbide. In particular implementation, the plastic foams may be composed of virgin or recycled polyethylene terephthalate (PET), polymethylmethacrylate (PMMA). In various implementations carbon foams may compose at least a portion of activated carbon. In implementations where the foam is made of a metallic, semi-metallic, or composite material, the foam may take the form of a mesh structure. Where the foams are made of polyethylene and other plastic materials, they may be those manufactured by New England Foam Products, LLC of Hartford, Conn. In various implementations where the foam takes the form of a mesh, the mesh treated with organosilane quaternary compounds could also be arranged in a three dimensional shape like a mechanical stirring device.

Implementations of antimicrobial foams like those disclosed herein are prepared by applying an aqueous or alcoholic solution containing about 0.1% to about 5.0% by weight of an organosilane quaternary ammonium halide compound to the foam substrate by immersion, pressure spray, electrostatic spray methods, and other methods disclosed in this document. The wetted foams are allowed to air dry or are heated to approximately 120 C to complete curing of the antimicrobial film to the surfaces of the foam cells. When dried/cured, the surface of the foam cell structures contains a substantially uniform film of the organosilane material bonded to the surface through silsesquioxane-like structures. The resultant bonded film is insoluble in water and common solvents and is not removed or leached off during operation in aqueous environments. The coverage of the bonded film on the structure of the foam can be evaluated visually by performing a blue dye test using bromophenol blue. The test is carried out by applying a quantity of bromophenol blue solution to the foam, and after allowing the solution to rest on the foam for about 30 seconds, washing the bromophenol blue solution out of the foam. The portions of the structure of the foam that retain the blue color are those that contain bonded film, as the bromophenol blue couples to the organosilane material and not to the foam material.

In various implementations, the organosilane quaternary compound used for treating may be octadecyldimethyl-(3-trihydroxsilylylpropyl) ammonium chloride. In other implementations, organosilane starting materials for formation of films may include one, all, or any of the following:

Octadecyldimethyl-(3-methoxysilyslpropyl)ammonium chloride: $C_{18}H_{35}(CH_3)_2N^+(CH_3O)_3SiC_3H_7Cl^-$ Tetradecyldimethyl-(3-trimethoxysilylpropyl)ammonium chloride: $C_{14}H_{29}(CH_3)_2N^+(CH_3O)_3SiC_3H_7Cl^-$ Didecylmethyl-(3-trimethoxysilylpropyl)ammonium chloride $(C_{10}H_{21})_2CH_3N^+(CH_3O)_3SiC_3H_7Cl^-$ In various implementations, other substrate reactive organosilanes including ammonium chloride moieties may be utilized. Any of the organosilane compounds disclosed in this document may be employed in various implementations.

In this document, filter media treated with organosilane quaternary ammonium materials are disclosed that remove pathogens from water passing through the filter media of 2 log for bacteria and up to 98% for parasitic protozoa such as *Cryptosporidium parvum*. It was previously theorized that the increased surface area of a media, especially in the case of filter media such as sand or zeolites, would result in increased elimination and inactivation of pathogens dispersed in the water. The foams disclosed herein have a greatly reduced surface area (less than or equal to about 1 $m^2$/gram) when compared with filter media such as filter sand (tens of $m^2$/gram) or zeolites (hundreds of $m^2$/gram), but also demonstrate significant antimicrobial activity when placed in a static container of liquid sufficient to disinfect the fluid. The open-cell foams have a minimal surface area as the foam, during manufacture, seeks to create a maximum volume with a minimum surface area and resulting surface energy (driven by surface tension and surface free energy effects).

It has been observed that organosilane quaternary treated foams manufactured according the principles in this disclosure eliminate and inactivate bacterial, viral and parasitic protozoa pathogens up to 6 log in 10 minutes of static exposure of the pathogen containing liquid to the submerged foam in a container for an effective period of time. Such foams treated with organosilane quaternary compounds have been demonstrated to rapidly and effectively disinfect fluids in which they are in contact by inactivating and eliminating a wide variety of pathogens including viruses (encapsulated and non-encapsulated), algae, gram positive bacteria, gram negative bacteria and parasitic protozoa including *Cryptosporidium parvum* and *Giardia*. Similar to the other antimicrobial compounds disclosed herein, the disinfection process is non-leaching and imparts no detectable antimicrobial agent or compounds into the contacting fluid. An example of the performance of an implementation of a treated foam is found below:

Example 7

Twenty samples of water containing bacteria, viruses, and *Cryptosporidium* oocytes were treated according to the standards in the NSF International P248 test for Military Operations Microbiological Water Purifiers. Passage of the test requires that within a maximum of 20 minutes for all 20 samples, the bacterial population decrease by 6 log, the viral population decrease by 4 log, and the *Cryptosporidium* oocytes be reduced by 3 log. When foams treated with 1-Octadecanaminium, N,N-dimethyl-N-(3-(trimethoxysilyl) propyl)-chloride were placed in the twenty samples, remaining in static contact with the water, in 10 minutes 18 of the 20 samples met the test criteria, and by 15 minutes, all 20 samples had experienced microbe reduction to the desired testing levels. In this case, the effective period of time was reached when residual microorganism levels in all the samples reached the desired reduced level, in 15 minutes.

Unlike the use of treated filter media discussed earlier in this document, the disinfection process occurs under static conditions of little to no fluid flow over the treated surface of the foam and is accordingly not a filtration process for pathogen removal. Because the foams are suitable for use in non-flowing, fluid conditions they may be useful for antimicrobial stabilization of fluids for extended periods in containers. Fluids in contact with treated foams may be stored for extended periods without microbial growth or the need for external influences such as refrigeration. Because of this, implementations of treated foams like those disclosed herein may be incorporated in fluid transport vehicles, such as milk tanker trailers, and other bulk foodstuff transport vehicles and systems. An additional benefit for vehicles like milk tanker trailers is that if the foams are attached at regular intervals along the internal circumference of the tank with a dimension extending radially into the milk payload, they will have a baffling effect, reducing momentum flow effects of the milk moving around during transport. However, because the foams are antimicrobial, the problems of trying to clean a conventional tank with metal baffles may be eliminated. In some implementations, gravity fed flow filtration using treated foams may be used, provided it is carried out at low pressures that do not mechanically harm the films.

This result of increased efficacy of the open-cell treated substrate when compared with the performance of organosilane treated filter media is unexpected. This is because the surface area of foam media contacting the contaminated fluid is far less than filter media. For example, the surface area per volume of the foam implementations when compared with the surface of zeolite and sand is millions of times smaller. For example, the surface area of a zeolite ranges in the hundreds of square meters per gram. In contrast, a treated foam with a surface area of just 36.4 square feet can disinfect a water bladder that holds 2.5 liters of water. This disinfection using foams takes place rapidly (90 seconds-15 minutes) compared to previous systems that involved coating the interior surface of a bottle with organosilane materials (3 hours). Being able to obtain orders of magnitude improved inactivation or similar inactivation of microbes as with use of treated filter media from a foam with orders of magnitude less surface area employed in a non-forced flow, static fluid operating condition is an unexpected result which runs contrary to conventional knowledge of those of ordinary skill in the art.

Once prepared by coating with organosilane quaternary ammonium compounds, the treated foams can be stored outside liquid for greater than 5 years and still retain their antimicrobial activity. Because of this, the effective antimicrobial lifetime of a treated foam is determined by the ability of the particular underlying foam material to withstand prolonged exposure to the fluid without beginning to shed or otherwise breakdown mechanically within the fluid. This means that the limit to the volume of liquid that could be potentially treated by a coated foam is the mechanical lifetime/stability of the foam.

Implementations of foams like those disclosed herein are capable of disinfection of clear and turbid water as well as visually opaque fluids including food juices, plant extracts, milk, and milk products. These foams may be particularly useful for visually opaque fluids as conventional methods of fluid disinfection include widespread use of energy intensive ultraviolet (UV) radiation for which the fluid must be transparent. Because the foams do not require adding any liquid matter to the liquid or leach into the fluid, they contrast with other conventional methods which require the addition of toxic, fluid soluble compounds including energy intensive and toxic ozone or equally toxic, carcinogenproducing chlorine, iodine, chlorine dioxide and chloramines. Implementations of foams like these disclosed may be used to disinfect cutting or fracking fluids (hydrocarbon [oil] and water mixtures) as well as any other flowable liquid that does not contain particulates that would clog the foam. Implementations of foams like those disclosed herein may also be employed to disinfect solid materials, such as powders that are dispersable and can contact the foam. In other implementations, implementations of the foams may be used to provide disinfection of solids and liquids through surface contact. For example, in meat packaging, the meat may be laid down on a piece of treated foam (which may be the packaging container in particular implementations), which will act to kill microbes in the meat and in liquids associated with the meat during transport and storage prior to food preparation. In such implementations, one or more surface of the meat (or other solid) are contacted by the foam.

Implementations of static fluid disinfecting systems employing open-cell foams like those disclosed herein may employ various implementations of a method of disinfecting a fluid. Implementations of the method include statically contacting a fluid containing one or more microorganisms with a foam coated with any one of the quaternary organosilanes disclosed herein in a container that encloses the foam and holds the fluid. The fluid may contain one or more of any of the microorganisms disclosed herein. In various implementations of the method, the method may include statically contacting one or more surfaces of a solid included in the container with the foam. This solid could be any disclosed in this document, including foodstuffs and other solid materials that contain one or more microorganisms.

Implementations of ballast water treatment systems are disclosed in this document. Ballast water treatment systems are used in ships and vessels traveling via water that retain or store water for stabilization as ballast.

In 2004, the International Convention for the Control and Management of Ships' Ballast Water and Sediments (the Convention) was adopted and has been ratified by sufficient states to go into effect in 2016. The Convention includes basic standards controlling the amount of harmful aquatic organisms and pathogens found in ballast water that may be released by a ship of any size. The ballast water is taken up typically at the beginning of a ship's voyage to a new port and, accordingly, is composed of those aquatic organisms and pathogens that are present in the water in the port of origin. When reaching the destination, release of some or all of the stored ballast water is generally done as part of preparation of the ship for its next voyage. Since the ship is now at its port of destination, the aquatic organisms present in the ballast water are potentially not native to that area. Since these non-native aquatic organisms enter the environment of the port of destination separate from their natural predators, they can rapidly become an invasive species and destroy the ecological variety of the destination port. Zebra mussels are an example of a non-native, invasive species that has traveled to North America through ballast water.

A summary of the Convention standards is found in Appendix C of the U.S. Provisional Patent Application 62/040,348 to William R. Peterson II, et al., entitled "Ballast Water Treatment Systems," which was filed on Aug. 21, 2014 (the '348 Provisional), the disclosure of which was previously incorporated entirely herein by reference. To reach these standards for discharged ballast water from the ship at the port of destination, various conventional ballast water treatment systems have been devised. In the United States, regulations regarding management of ballast water and associated penalties may be found in 33 C.F.R. §151.1500 et. seq. (2012) and the regulations regarding the approval of ballast water management systems (BWMS) may be found in 46 C.F.R. §162.060 et seq. (2012) the disclosures of which are incorporated entirely herein by reference.

Figure 7:
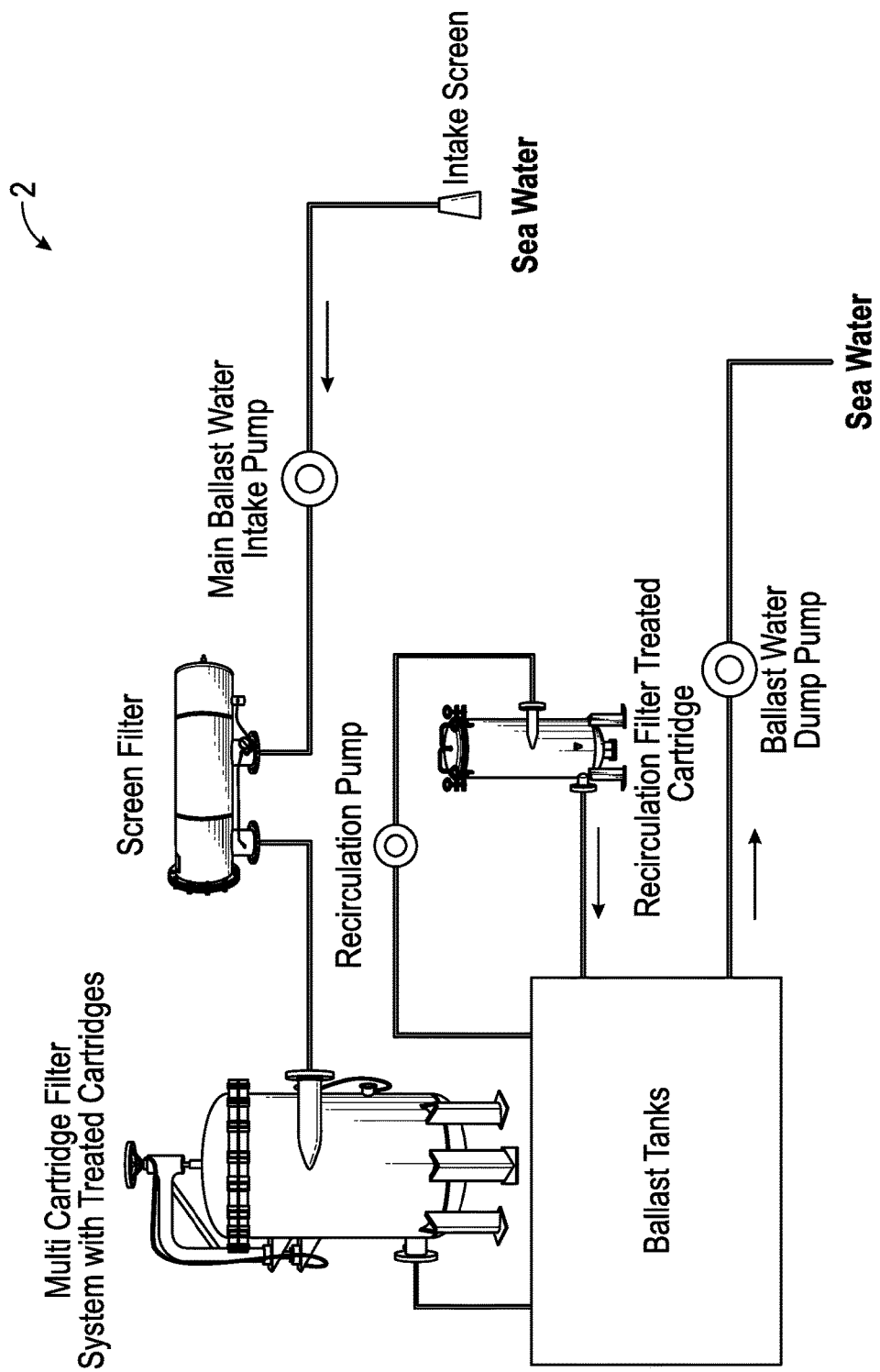
FIG. 7 illustrates a block diagram of a first implementation of a ballast water management system (BWMS)

Various implementation of BWMS using quaternary ammonium organosilane compounds are disclosed in this document. Referring to FIG. 7, an implementation of a BWMS 2 is illustrated that utilizing quaternary ammonium organosilanes to destroy microorganisms in ballast water. As shown, water (whether fresh or sea water) for use as ballast water enters through an intake screen, being drawn in through the main ballast water intake pump. The water then is passed passes through one or more screen filters (varying sizes of screens may be used). The ballast water is then passed through one or more multi-cartridge filter devices (in series or parallel) containing cartridges (cartridge filters) that contain quaternary ammonium organosilane coatings. The resulting filtered ballast water then enters the ballast tank (one or more ballast tanks may be used, located various places on a ship or vessel).

Depending upon the antimicrobial performance of the BWMS, in some implementations, the filtered sea water may be sufficiently filtered and/or purified to be stored and subsequently released from the ballast tanks following one pass through the one or more multi-cartridge filters without requiring further treatment to meet the regulatory standards disclosed. In other implementations, while the filtered sea water is residing in the one or more ballast tanks, the filtered sea water is drawn into a recirculation loop through use of one or more recirculation pumps and into one or more recirculation filters containing one or more cartridges treated to form a coating of quaternary ammonium organosilanes on the material of the one or more cartridges. The recirculated water then circulates back into the one or more ballast tanks. When changes in the amount ballast water in the ballast tanks need to be made, water from the ballast tanks is drawn out using the ballast water dump pump and discharged into the ambient sea water surrounding the ship. As required by various regulations, the crew of the ship will have completed testing of the ballast water in the ballast tanks to determine the organism and pathogen levels prior to discharging any of the water.

The foregoing high level review of the process shows the overall flow of sea water into and out of the ballast tanks. Various implementations of the system will employ various filtration, intake, and pumping components to perform the various functions of the system. Various system implementations operate identically using fresh water as in sea water.

In various implementations, and for the exemplary purposes of this disclosure, the intake screen may be any of the self-cleaning suction screens disclosed in Appendix E of the '348 Provisional manufactured by VAF Filtration Systems of Arvada, Colo. Many other intake screen designs may be utilized in various implementations which are adapted to such factors as the required volume of water, the cleanliness of the sea water surrounding the vessel, and the size of the intake piping. In the implementations disclosed in Appendix E, the interior of the screen is washed continuously using rotating water jets while intake water is being simultaneously drawn into the screen preventing particles from between about 710 microns to about 1680 microns from being able to enter with the intake water.

The one or more screen filters for processing the intake sea water may be, in various implementations, any of the LPV-Series automatic screen filters manufactured by VAF Filtration Systems of Arvada, Colo. These screen filters permit filtration of matter and organisms down to 80 microns at varying flow rate while allowing for cleaning of the filtered material from the filter without stopping of the operation of the screen filter system. The filter material drawn from the screen filter can be, in various implementations, discharged directly into the water surrounding the vessel, as the filtered organisms are the same as those in the intake water and no contamination issues exist with these organisms. While in various implementations, screen filters could be used, in others, other passive or automatic filtration systems could be employed, including, by non-limiting example, membrane, sand, zeolite, and other filter media systems. In all implementations, one or more filter screens/membranes/stages may be included in each filter, and, where more than one filter is used, they may be arranged to treat the intake water in parallel or in series or in series/parallel combinations as desired.

Figure 9:
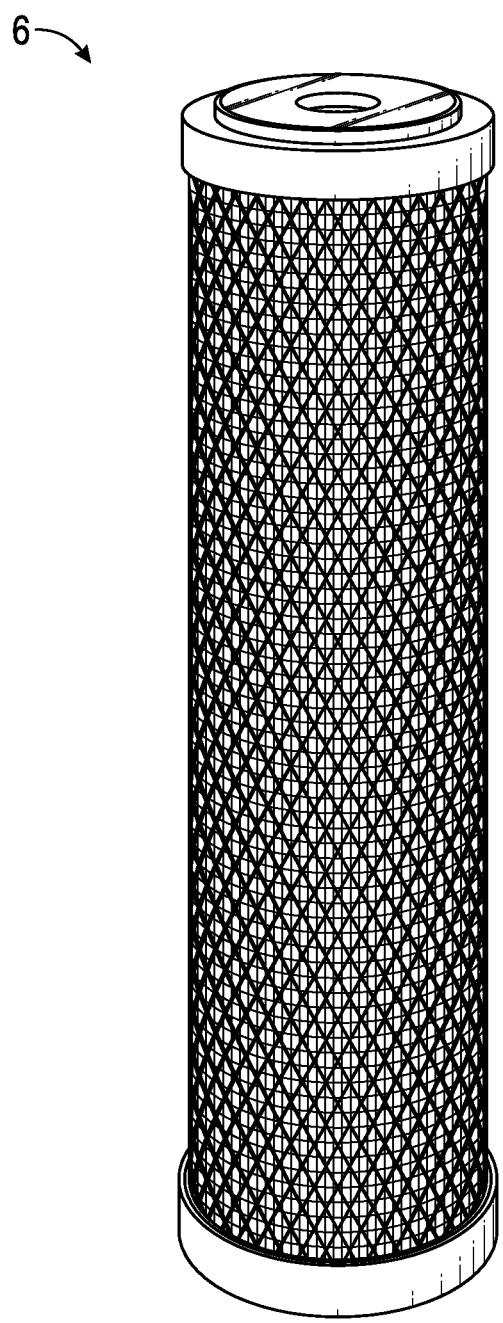
FIG. 9 illustrates an exemplary cartridge filter for use in a multi-cartridge filter system.

Intake water leaving the screen filter is then processed by a multi-cartridge filter system containing many cartridges (cartridge filters) that have been treated with quaternary ammonium organosilanes to form a coating on the material of filters. A wide variety of filter systems capable of including multiple cartridges may be included in various systems implementations. For the exemplary purposes of this disclosure, the multi-cartridge systems disclosed in Appendix G of the '348 Provisional manufactured by HARMSCO Filtration Products of North Palm Beach, Fla. may be used in particular implementations. Appendix G also discloses examples of filter cartridge types that may be treated and used to filter the intake water. Referring to FIG. 9, an example of filter cartridge that can be treated with quaternary ammonium organosilanes is illustrated (see also those in Appendix H of the '348 Provisional). In various implementations, many different filter types (wound filters, sand filters, zeolite filters, etc.) may be treated with quaternary ammonium organosilanes and placed in a multi-cartridge system like those in disclosed in Appendix G (or other systems) and used for filtration. Various combinations of different filters types may be also used in the same multi-filter cartridge filter system. Bag filters may also be employed in particular implementations. The systems in illustrated in Appendix G of the '348 Provisional may have improved filtration characteristics because they employ cyclonic movement of the water within the filter vessel over and through the plurality of filter cartridges contained therein.

A wide variety of quaternary ammonium organosilane compounds may be employed in various implementations of ballast water treatment systems like those disclosed herein. For example, the compounds could be any of those disclosed in this document and in any of the references incorporated by reference herein, including the '348 Provisional.

Particular implementations of systems may utilize any one or any combination of the following quaternary ammonium organosilanes: Tetradecyldimethyl(3-trimethoxysilylpropyl)ammonium chloride (CAS No. 41591-87-1); Octadecyldimethyl(3-trimethoxysilylpropyl)ammonium chloride (CAS No. 27668-52-6); and Didecylmethyl-N-(3-trimethoxysilylpropyl)ammonium chloride (CAS No. 68959-20-6). Implementations of various systems may employ quaternary ammonium organosilanes which may include silanes represented by the formula:

$$A_{4-n}Si(RNHaR^1{}_bZ)_n$$

A, R, a, n, $R^1$, b, and z may be any chemical structural moiety (element) identified by the same notation in U.S. Pat. No. 6,613,755 to William R. Petersen II et al., entitled "Antimicrobial skin preparations containing organosilane quaternaries," filed Mar. 29, 2002 and issued Sep. 2, 2003, the disclosure of which is incorporated entirely herein by reference. Furthermore, implementations of various ballast water treatment systems may employ quaternary ammonium organosilanes which may include silanes represented by the formula:

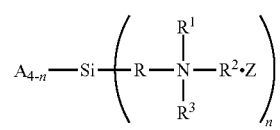

In these implementations, A, n, R, $R^1$, $R^2$, $R^3$, and Z may be any chemical structural moiety identified by the same notation in the '121 utility, '429 provisional, the '720 utility, and the '348 Provisional.

Any of the methods of treating filter media, filter cartridges, and disinfecting foams disclosed in the '121 utility, '429 provisional, '720 utility, the '477 provisional, and the '348 provisional with quaternary ammonium organosilane compounds may be employed to treat the filter cartridges and/or filter media included in the filter cartridges that are included in the multi-cartridge filter system and form a coating thereon. As disclosed in the foregoing applications, the quaternary organosilane compounds are non-leaching, meaning that there is no detectable active agent present in water leaving the filters. The life span of the coating of quaternary ammonium organosilane compound on the filter media may be about 5 years.

The filters employed may filter pathogens and organisms sized from about 0.2 microns to about 25 microns to about 50 microns. In particular implementations, the filters may be about 3-4 inches in diameter and about 40 inches long. In other implementations, the filters may be about 3 inches long. Depending upon the amount of intake water needing to be processed, the number of filters included in the multi-cartridge system may be just a few to greater than 160 filters. In various implementations, cartridge filters like those disclosed herein may not be used, but the multi-cartridge filter system may be adapted for using treated filter sand, treated zeolite, or other treated filter media that has been treated to form a coated quaternary organosilane coating like any of those disclosed in this document and the references incorporated herein using any reagent disclosed therein. In other implementations, a combination of cartridge filter(s) and treated filter sand, treated zeolite, or other treated filter media coated with a quaternary organosilane coating like those disclosed herein may also be used. Any of the treated filter sand, treated zeolite, or other treated filter media disclosed in this document any in any of the references incorporated herein by reference may be used in various implementations.

As disclosed and discussed at length in the '348 provisional and the references incorporated herein by reference, as the effectiveness of the quaternary ammonium organosilane compounds for killing and/or deactivating viruses, bacteria, cysts, spores, yeasts, fungus, eggs, and other microscopic organisms and pathogens is very high, in ballast water treatment systems like those disclosed herein, the intake water may be cleaned to at least the regulatory standards in Appendix C of the '348 provisional after just a single pass through the multi-cartridge filter system. Accordingly, the water entering the ballast tanks could be immediately discharged following testing without requiring any additional filtration.

Figure 8:
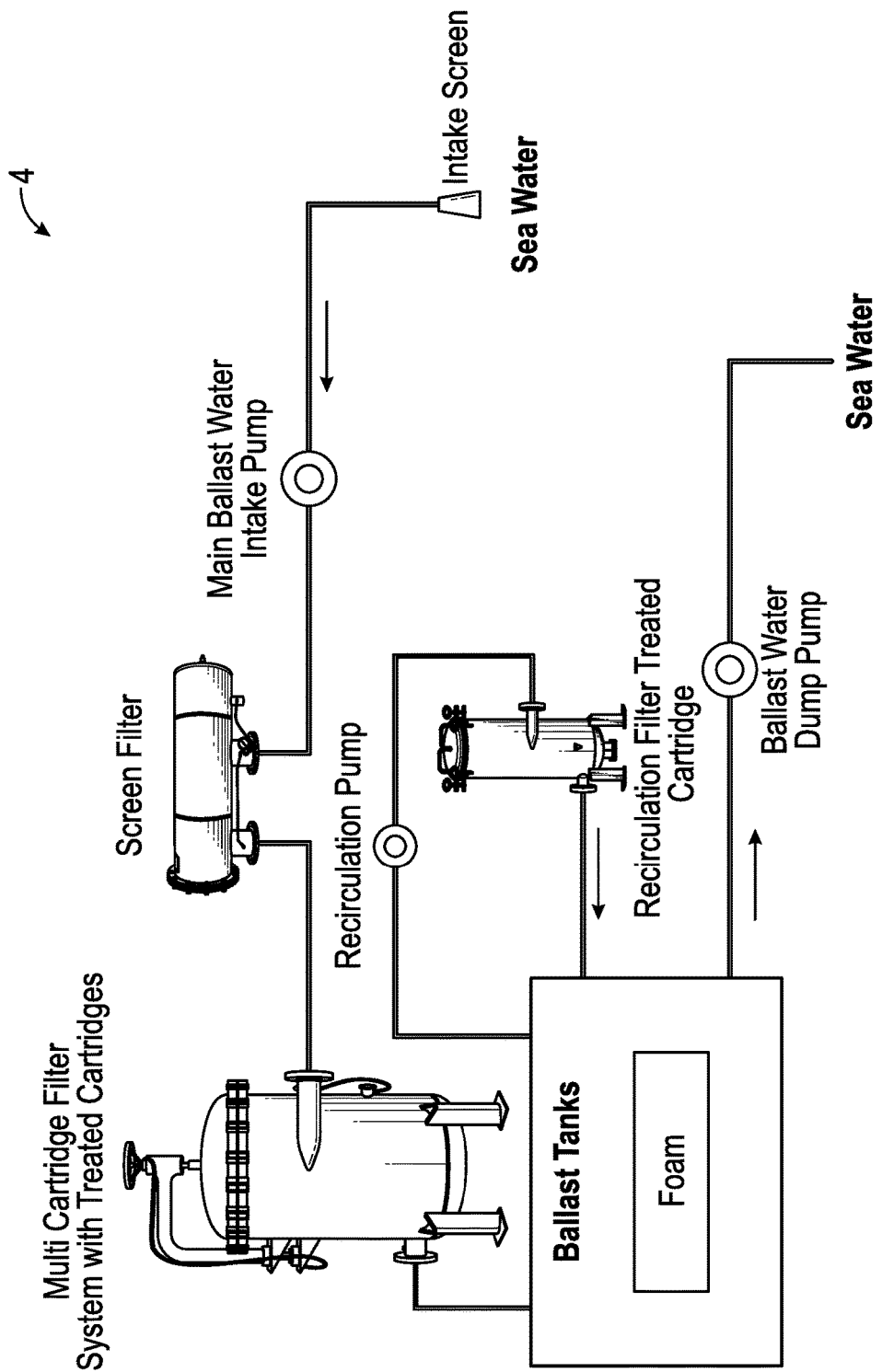
FIG. 8 illustrates a block diagram of a second implementation of a BWMS.

Since the filtered water in the ballast tanks has the potential to remain in the tanks for an extended period of time during various voyages, the use of a recirculation loop as illustrated FIGS. 7 and 8 as an aid in maintaining the filtered water in the ballast tanks at the desired cleanliness standard may be important in various system implementations. In such systems, the recirculation system can operate continuously or periodically on a desired interval, using the recirculation pump to draw water from the ballast tanks and pass it through the recirculation filter. In various implementations, the recirculation filter may be a multi-cartridge filter system (though sized proportionally smaller to the lower flow), may be a single filter system, or a series and/or parallel set of two or more filters. Any of the multi-cartridge filter systems disclosed herein may be employed in various implementations.

In particular implementations of the system, in addition to the filter cartridges and/or filter media being treated with quaternary ammonium organosilane compounds, the other components of the system that contact the ballast water may also be coated with a layer of quaternary ammonium organosilanes. Depending upon the implementation, the intake screen components, pumps and pump impellers, interior components of the screen filter, the water-contacting surfaces of the multi-cartridge filter system and recirculation filter, all piping, and the interior surfaces of the ballast tanks (walls, floors, or any surface and/or any combination of surfaces thereof) can be coated with a layer of quaternary ammonium organosilane compounds like those selected herein. Any of the coating techniques disclosed in any of the references incorporated by reference herein may be employed. Also, in various implementations, the quaternary ammonium organosilane compound precursor materials may be applied to the desired surfaces of the various system components using electrostatic spraying to prevent domain formation behavior and beading of the film. In particular implementations, two rounds of spraying may be carried out following which a curing process is employed to transition the precursor material sprayed from a monomeric material to self-assembling layers to form a fully cured silsesquioxane (organosilsesquioxane) structured film. Following use of the system, the various system components may need the film reapplied periodically to keep the film actively able to kill and destroy organisms and pathogens. Because the various system components may also be treated with the quaternary ammonium organosilane compounds, several beneficial effects may exist, including the elimination/minimization of the formation of biofilms in various parts of the system which create sources of continuous contamination and making it easier to treat and maintain the ballast water at the desired cleanliness standards.

Implementations of ballast water management systems like those disclosed herein may be employed in a wide variety of watercraft including those subject to the regulations in the Convention and those which are not. Implementations of the system may be used for both fresh and marine (salt water) applications, and may, in various system implementations, be equally successful in both fresh and marine applications without requiring any operational changes. Smaller systems may be included in water craft that operate in fresh waters only and which do not include ballast tanks, but take on water during normal operation or during storage at a dock in the form of bilge water. Because of the single pass kill capabilities of the systems disclosed herein employing quaternary ammonium organosilanes, such smaller systems may be developed to treat bilge water at the time it is released. Because of this, regulations for smaller craft that currently require draining and drying before transferring the smaller craft from one body of water to another may be unnecessary, as the system is capable of treating any bilge water released from the vessel in the new body of water sufficiently to eliminate the pathogens/organisms present in the bilge water that came from the previous body of water.

Furthermore, in various ballast water management systems, static disinfection systems and methods like those described in the '720 utility, and the '477 provisional may be employed. For example, in smaller ships where the ballast tanks are small, there may not be much space for piping for a recirculation loop. Accordingly, the ballast tanks could be at least partially filled with/contain an open-celled foam material coated with the quaternary ammonium organosilane compounds and, while the ballast water resides in the ballast tanks, static disinfection using the foam may take place as disclosed in the references incorporated herein by reference. An implementation of such a ballast water management system is illustrated in FIG. 8, which shows a ballast tank partially filled with a static disinfecting foam in combination with a recirculation loop. However, in other implementations, the recirculation loop may not be included due to size/complexity restrictions and/or may not be needed in view of the presence of the foam.

Furthermore, in system implementations that do not employ a recirculation loop, the system may be designed to pass the ballast water back through the multi-cartridge filter system for a second pass prior to being discharged. A wide variety of system implementations are possible using the principles disclosed herein, including various recycle, multiple pass, recirculation systems that filter between ballast tanks, and others. Those of ordinary skill in the art will readily be able to construct system implementations using the principles disclosed herein.

Example 7

A sample of the marine salt water (Pacific Ocean, San Diego Bay, Calif.) was used with a test apparatus to determine microbial reduction utilizing treated cartridge filter systems. The test apparatus consisted of stainless steel and PVC piping 0.75 inches in diameter. Pumping through the system was accomplished utilizing an air-actuated diaphragm pump with an adjusted flow rate of 1-2 gallons per minute through two types of test cartridge filters. Test cartridges were Parker Fulflo Poly-Mate (#PM600-10AE-DO) and Parker Fulflo Glass-Mate (#PMG400-10FE-DO) filters. Filters were utilized in testing as untreated (as received) or treated with a quaternary ammonium organosilane compound marketed under the tradename Z71 by Zoono of New Zealand (Coating Systems Laboratories, Inc., EPA Reg. No. 008007-1, 3-trimethoxysilyl propyl dimethyl octadecyl ammonium choride) solution through immersion and oven drying at 120° C. Flow rates were measured utilizing PVDF Flowmeter/Totalizer (GPI, Great Plains Industries) calibrated for flow rates of 1.2-12.0 gallon per minute. Microbial testing was performed using a Hygiena ATP meter in conjunction with Hygiena Aquasnaps (#AQ-100). A test apparatus was assembled and testing performed for four filter systems. Filter system A consisted of untreated Poly-Mate filter. Filter system B consisted of Z71 treated Poly-Mate cartridge filter. Filter system C contained the untreated Glass-Mate cartridge and Filter system D contained the Z71 treated Glass-Mate cartridge. The units were assembled individually by placing each designated filter system into the cartridge holder within the test apparatus. The assembled units were tested individual at a flow rate of 1.0-1.2 gpm. Initial microbial count of the San Diego seawater before testing was measured at 720 utilizing Hygiena test meter and Hygiena Aquasanp. Results of the testing using the four systems are summarized in Table 1:

TABLE 1

| Filter System | Initial Microbial Count | Count After Filtration | Reduction (%) |
|---|---|---|---|
| A | 720 | 646 | 10.3 |
| B | 720 | 12 | 98.3 |
| C | 720 | 664 | 7.8 |
| D | 720 | 6 | 99.1 |

As can be observed, filter systems B and D that were coated with a quaternary ammonium organosilane material achieved a greater than 95% reduction in microbes through only one pass through the filter.

In places where the description above refers to particular implementations of ballast water treatment systems and implementing components, sub-components, methods and sub-methods, it should be readily apparent that a number of modifications may be made without departing from the spirit thereof and that these implementations, implementing components, sub-components, methods and sub-methods may be applied to other ballast water treatment systems. For example, the features of the reagents of the various implementations are equally applicable to the coatings of the implementations described herein.

What is claimed is:

1. A ballast water treatment system comprising:
an intake screen adapted to receive untreated water from a body of water surrounding a ship comprising microorganisms;
a ballast water intake pump coupled to the intake screen and adapted to draw untreated water in through the intake screen;
a screen filter coupled to the ballast water intake pump, the screen filter adapted to perform a screening of the ballast water output by the ballast water intake pump;
a particulate filter system coupled to the screen filter and with one or more ballast water tanks configured to be coupled to the ship, the particulate filter system comprising particles 0.6 mm to 6 mm in length;
a ballast water dump pump coupled with the one or more ballast tanks and adapted to draw out treated water stored in the one or more ballast tanks and discharge it back to the body of water surrounding the ship;
wherein the particulate filter system comprises particles comprising a quaternary organosilane coating produced from a quaternary ammonium organosilane reagent having the formula:

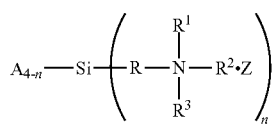

wherein A is a member independently selected from the group consisting of —OR$^4$, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; and
wherein R$^4$ is a member selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; and
R is substituted or unsubstituted alkylene;
R$^1$, R$^2$, and R$^3$ are members each independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl; and substituted or unsubstituted heteroaryl;
Z is a member selected from the group consisting of fluoride, chloride, bromide, iodide, tosylate, hydroxide, sulfate, and phosphate; and
n is 1, 2, or 3.

2. The system of claim 1, wherein the body of water comprising microorganisms is one of salt water and fresh water.

3. The system of claim 1, further comprising a recirculation pump coupled with the one or more ballast water tanks, the recirculation pump coupled with a recirculation filter comprising particles 0.6 mm to 6 mm in length coated with the quaternary organosilane coating, the recirculation pump adapted to draw treated water from the one or more ballast water tanks through the recirculation filter and back into the one or more ballast water tanks.

4. The system of claim 1, wherein the one or more ballast water tanks further comprise an open-celled foam coated with the quaternary organosilane coating.

5. The system of claim 4, wherein the open-celled foam comprises a material selected from the group consisting of polymeric materials, stainless steel, copper, silicon, carbon, and silicon carbide.

6. The system of claim 4, wherein the open-celled foam comprises a range of pores per inch (PPI) between 10 PPI and 110 PPI.

7. The system of claim 4, wherein the open-celled foam comprises a surface area per gram less than a surface area per gram of one of filter sand and zeolite.

8. The system of claim 1, wherein a surface of the one or more ballast tanks is coated with the quaternary organosilane coating.

9. The system of claim 1, wherein the quaternary ammonium organosilane reagent comprises one of Tetradecyldimethyl(3-trimethoxysilylpropyl)ammonium chloride; Octadecyldimethyl(3-trimethoxysilylpropyl)ammonium chloride; Didecylmethyl-N-(3-trimethoxysilylpropyl)ammonium chloride; and any combination thereof.

10. A ballast water treatment system comprising:
an intake screen adapted to receive untreated water from a body of water surrounding a ship comprising microorganisms;
a ballast water intake pump coupled to the intake screen and adapted to draw untreated water in through the intake screen;
a screen filter coupled to an outlet of the ballast water intake pump, the screen filter adapted to perform a screening of treated water output by the ballast water intake pump;

a particulate filter system coupled to the screen filter and with one or more ballast tanks configured to be coupled to the ship, the particulate filter system comprising particles 0.6 mm-6 mm in length;
a ballast water dump pump coupled with the one or more ballast tanks and adapted to draw out treated water stored in the one or more ballast tanks and discharge it back to the body of water surrounding the ship;
wherein the particulate filter system comprises particles comprising a quaternary organosilane coating produced from a quaternary ammonium organosilane reagent having the formula:

wherein A is a member selected from the group consisting of alkoxy radicals of 1 to 8 carbon atoms, alkylether alkoxy radicals of 2 to 10 carbon atoms, and alkyl radicals with 1 to 4 carbon atoms;
R is a divalent hydrocarbon radical with 1 to 8 carbon atoms;
$R^1$ is a member selected from the group consisting of alkyl radicals with 1 to 12 carbon atoms, alkyl ether hydrocarbon radicals of 2 to 12 carbon atoms, hydroxy-containing alkyl radicals of 1 to 10 carbon atoms, and nitrogen-containing hydrocarbon radicals of 1 to 10 carbon atoms, wherein the nitrogen atom has three bonds;
a is 0, 1, or 2; b is 1, 2 or 3; and the sum of a and b is 3;
Z is a member selected from the group consisting of chloride, bromide, iodide, tosylate, hydroxide, sulfate, and phosphate; and
n is 1, 2 or 3.

11. The system of claim 10, wherein the body of water comprising microorganisms is one of salt water and fresh water.

12. The system of claim 10, further comprising a recirculation pump coupled with the one or more ballast water tanks, the recirculation pump coupled with a recirculation filter comprising particles 0.6 mm to 6 mm in length coated with the quaternary organosilane coating, the recirculation pump adapted to draw treated water from the one or more ballast water tanks through the recirculation filter and back into the one or more ballast water tanks.

13. The system of claim 10, wherein the one or more ballast water tanks further comprise an open-celled foam coated with the quaternary organosilane coating.

14. The system of claim 13, wherein the open-celled foam comprises a material selected from the group consisting of polymeric materials, stainless steel, copper, silicon, carbon, and silicon carbide.

15. The system of claim 13, wherein the open-celled foam comprises a range of pores per inch (PPI) between 10 PPI and 110 PPI.

16. The system of claim 13, wherein the open-celled foam comprises a surface area per gram less than a surface area per gram of one of filter sand and zeolite.

17. The system of claim 10, wherein a surface of the one or more ballast tanks is coated with the quaternary organosilane coating.

18. A ballast water treatment system comprising:
an intake screen;
a ballast water intake pump coupled to the intake screen;
a screen filter coupled to an outlet of the ballast water intake pump;
a particulate filter system coupled to the screen filter and with one or more ballast tanks, the particulate filter system comprising particles 0.6 mm-6 mm in length;
a ballast water dump pump coupled with the one or more ballast tanks;
wherein the multi-cartridge filter system comprises two or more cartridge filters comprising a quaternary organosilane coating produced from a quaternary ammonium organosilane reagent having the formula:

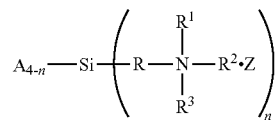

wherein A is a member independently selected from the group consisting of $—OR^4$, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; and
wherein $R^4$ is a member selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl; and
R is substituted or unsubstituted alkylene;
$R^1$, $R^2$, and $R^3$ are members each independently selected from the group consisting of hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl; and substituted or unsubstituted heteroaryl;
Z is a member selected from the group consisting of fluoride, chloride, bromide, iodide, tosylate, hydroxide, sulfate, and phosphate; and
n is 1, 2, or 3; and
wherein the ballast water treatment system is adapted to receive untreated water via the intake screen from a body of sea water comprising microorganisms and achieve at least a 95% reduction in a number of the microorganisms in the untreated water after a single pass through the particulate filter system.

* * * * *

UNITED STATES PATENT AND TRADEMARK OFFICE
CERTIFICATE OF CORRECTION

PATENT NO. : 9,764,264 B2
APPLICATION NO. : 14/832937
DATED : September 19, 2017
INVENTOR(S) : William R. Peterson, II and Delone Bentz It is certified that error appears in the above-identified patent and that said Letters Patent is hereby corrected as shown below:

In the Specification

Column 9, Lines 39 - 42, insert after 'selected from -OR$^4$, unsubstituted (C$_1$-C$_{10}$)alkyl, unsubstituted' --2 to 12 membered heteroalkyl, unsubstituted (C$_5$-C$_7$)cycloalkyl, unsubstituted 5 to 7 membered heterocycloalkyl, unsubstituted aryl, and unsubstituted heteroaryl. In other implementations, A is selected from -OR$^4$, unsubstituted (C$_1$-C$_{10}$)alkyl, unsubstituted--

Signed and Sealed this
Seventh Day of November, 2017

Joseph Matal
*Performing the Functions and Duties of the*
*Under Secretary of Commerce for Intellectual Property and*
*Director of the United States Patent and Trademark Office*